(12) United States Patent
Takahashi et al.

(10) Patent No.: US 12,401,096 B2
(45) Date of Patent: Aug. 26, 2025

(54) BATTERY WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

(72) Inventors: Hideo Takahashi, Osaka (JP); Yoshinori Ikai, Osaka (JP); Hideaki Nakajima, Osaka (JP); Yuhei Yamada, Osaka (JP); Daiji Yoshito, Osaka (JP); Yuki Ohira, Aichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 722 days.

(21) Appl. No.: 17/722,859

(22) Filed: Apr. 18, 2022

(65) Prior Publication Data
US 2022/0344780 A1 Oct. 27, 2022

(30) Foreign Application Priority Data

Apr. 22, 2021 (JP) .................................. 2021-072443

(51) Int. Cl.
*H01M 50/507* (2021.01)
*H01M 50/298* (2021.01)
*H01R 25/16* (2006.01)

(52) U.S. Cl.
CPC ....... *H01M 50/507* (2021.01); *H01M 50/298* (2021.01); *H01R 25/161* (2013.01)

(58) Field of Classification Search
None
See application file for complete search history.

(56) References Cited

U.S. PATENT DOCUMENTS

2014/0158396 A1  6/2014  Nakayama
2016/0359309 A1  12/2016 Nakayama et al.
2019/0199018 A1* 6/2019  Tsuchiya .............. H01R 11/284

FOREIGN PATENT DOCUMENTS

CN  105981198  9/2016
CN  109962181  7/2019
(Continued)

OTHER PUBLICATIONS

Machine Translation of JP2016091822 (Year: 2016).*
(Continued)

*Primary Examiner* — Wyatt P McConnell
(74) *Attorney, Agent, or Firm* — Greenblum & Bernstein, P.L.C.

(57) ABSTRACT

A battery wiring module including: bus bars including a terminating bus bar having an external connection portion; a case accommodating the bus bars; a cover portion mounted on the case to cover the bus bars while including a fixing portion mounted on the case, a large lid portion attached to the fixing portion via a first hinge portion to be rotatable from a first closed end covering the external connection portion and its peripheral region to a first open end exposing the external connection portion and its peripheral region, and a small lid portion attached to the large lid portion via a second hinge portion to be rotatable from a second closed end covering the external connection portion to a second (Continued)

open end exposing the external connection portion; and a retainer to retain the large lid portion at the first open end.

9 Claims, 17 Drawing Sheets

(56) References Cited

FOREIGN PATENT DOCUMENTS

| | | |
|---|---|---|
| JP | 2004-119340 | 4/2004 |
| JP | 2007-62745 | 3/2007 |
| JP | 2013-37988 | 2/2013 |
| JP | 2016-91822 | 5/2016 |
| JP | 2019-114392 | 7/2019 |
| JP | 7312518 | 7/2023 |

OTHER PUBLICATIONS

Office Action issued in Corresponding JP Patent Application No. 2021-072443, dated Feb. 15, 2023, along with an English translation thereof.
Office Action issued in Corresponding CN Patent Application No. 202210408467.4, dated Aug. 31, 2023, along with an English translation thereof.
Office Action issued in Corresponding JP Patent Application No. 2023-110869, dated May 16, 2025, along with an English translation thereof.

* cited by examiner

BATTERY WIRING MODULE

INCORPORATED BY REFERENCE

The disclosure of Japanese Patent Application No. 2021-072443 filed on Apr. 22, 2021 including the specification, drawings and abstract is incorporated herein by reference in its entirety.

BACKGROUND

1. Technical Field

This disclosure relates to a battery wiring module.

2. Description of the Related Art

Japanese Unexamined Patent Publication No. JP-A-2013-037988 discloses a battery wiring module mounted on a cell group in order to electrically connect the cell group in which a plurality of cells having a pair of positive and negative electrode terminals are arranged side by side. Such a battery wiring module includes a plurality of bus bars for electrically connecting the electrode terminals of the opposite polarities, a main body having insulation properties for accommodating the plurality of bus bars separately, and a cover portion for covering the opening of the main body. By mounting such a battery wiring module on the cell group, it is possible to simultaneously position a plurality of bus bars between the corresponding electrode terminals and collectively connect the cells.

SUMMARY

In the battery wiring module of JP-A-2013-037988, at the end of the battery wiring module, the pair of electrode terminals to which the bus bar for electrically connecting an external electric wire or the cell groups is mounted are exposed without being covered by the cover portion. Therefore, during vehicle maintenance, it may be desired to take measures that can suppress touching of the operator or the like on the exposed electrode terminals that can be a live portion. On the other hand, during vehicle manufacture, in order to ensure good workability when connecting the exposed electrode terminals of adjacent cell groups with a bus bar or the like, or when connecting an external electric wire to the exposed electrode terminal, there is also a conflicting request to ensure a wide exposure of the electrode terminals.

Therefore, the following description will disclose a battery wiring module capable of achieving improvement in safety during vehicle maintenance and improvement in workability during vehicle manufacture in a compatible manner.

The present disclosure provides a battery wiring module configured to be mounted on a cell group in which a plurality of cells are arranged side by side, the battery wiring module comprising: a plurality of bus bars configured to be electrically connected to the cell group, the bus bars including a terminating bus bar having an external connection portion; a case of insulation accommodating the plurality of bus bars; a cover portion mounted on the case to cover the plurality of bus bars, the cover portion comprising a fixing portion fixedly mounted on the case, a large lid portion attached to the fixing portion via a first hinge portion to cover the external connection portion and a peripheral region of the external connection portion of the terminating bus bar, the large lid portion being rotatable around the first hinge portion from a first closed end covering the external connection portion and the peripheral region of the external connection portion, to a first open end exposing the external connection portion and the peripheral region of the external connection portion, and a small lid portion constituted by a part of the large lid portion and attached to the large lid portion via a second hinge portion to cover the external connection portion, the small lid portion being rotatable around the second hinge portion from a second closed end covering the external connection portion, to a second open end exposing the external connection portion; and a retainer configured to retain the large lid portion at the first open end.

According to the present disclosure, it is possible to provide a battery wiring module capable of achieving improvement in safety during vehicle maintenance and improvement in workability during vehicle manufacture in a compatible manner.

BRIEF DESCRIPTION OF THE DRAWINGS

The foregoing and/or other objects, features and advantages of the disclosure will become more apparent from the following description of embodiments with reference to the accompanying drawings in which like reference numerals designate like elements and wherein.

DETAILED DESCRIPTION OF EMBODIMENTS

Figure 1:
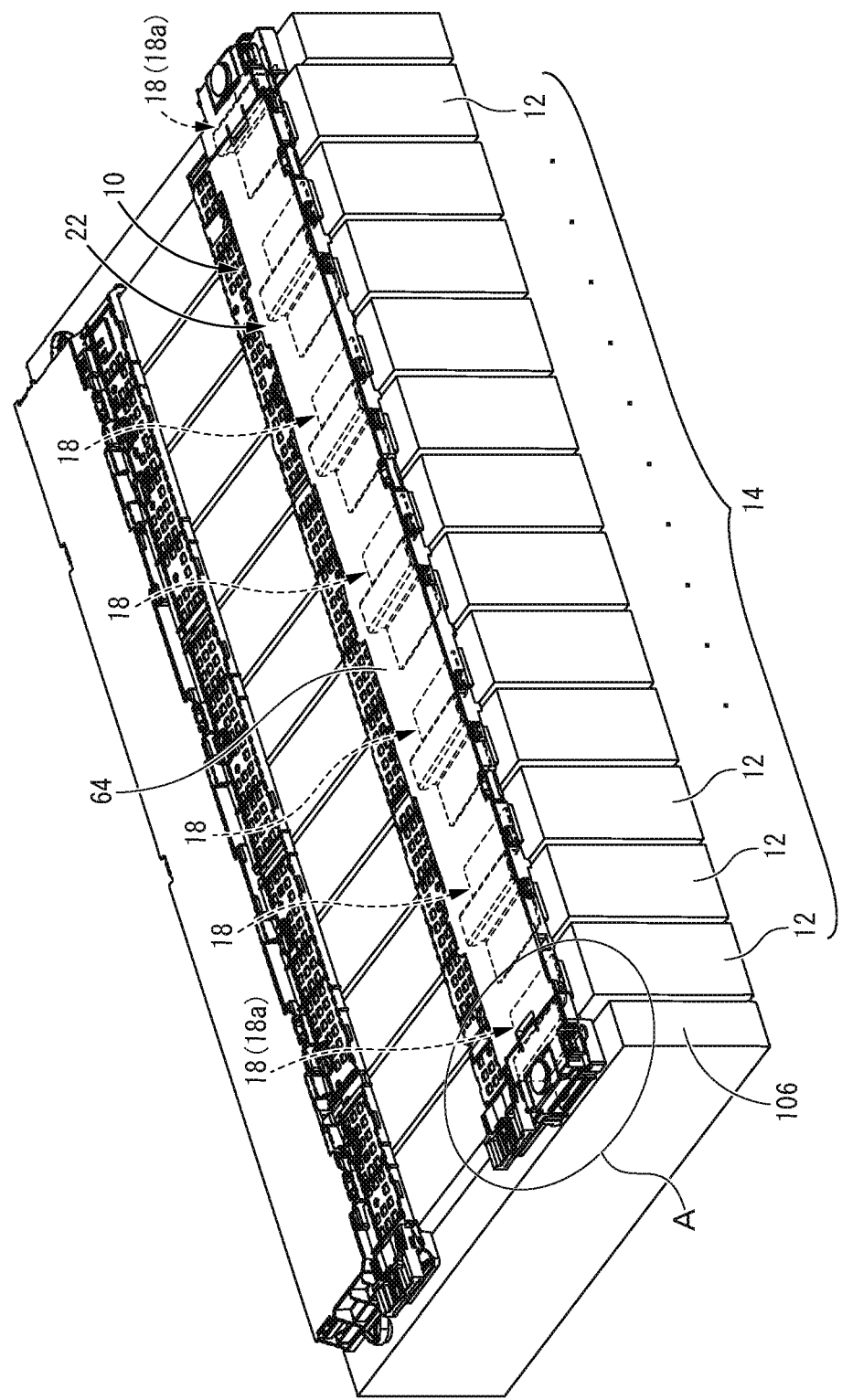
FIG. 1 is a perspective view showing a battery wiring module according to Embodiment 1 in a mounted state on a cell group.

Explanation of Embodiments of the Present Disclosure

First, preferred embodiments of the present disclosure will be listed and described.

(1) The present disclosure provides a battery wiring module configured to be mounted on a cell group in which a plurality of cells are arranged side by side, the battery wiring module comprising: a plurality of bus bars configured to be electrically connected to the cell group, the bus bars including a terminating bus bar having an external connection portion; a case of insulation accommodating the plurality of bus bars; a cover portion mounted on the case to cover the plurality of bus bars, the cover portion comprising a fixing portion fixedly mounted on the case, a large lid portion attached to the fixing portion via a first hinge portion to cover the external connection portion and a peripheral region of the external connection portion of the terminating bus bar, the large lid portion being rotatable around the first hinge portion from a first closed end covering the external connection portion and the peripheral region of the external connection portion, to a first open end exposing the external connection portion and the peripheral region of the external connection portion, and a small lid portion constituted by a part of the large lid portion and attached to the large lid portion via a second hinge portion to cover the external connection portion, the small lid portion being rotatable around the second hinge portion from a second closed end covering the external connection portion, to a second open end exposing the external connection portion; and a retainer configured to retain the large lid portion at the first open end.

According to this structure, the plurality of bus bars electrically connected to the cell group are accommodated in the case of insulation and covered with the cover portion attached to the case. The plurality of bus bars include the terminating bus bar having the external connection portion, and the cover portion covering the bus bars has the large lid portion that is rotatably attached to the fixing portion fixedly mounted on the case via the first hinge portion. The large lid portion covers the external connection portion and the peripheral region thereof, and is rotatable around the first hinge portion from the first closed end closing the external connection portion and the peripheral region thereof, to the first opening end exposing the external connection portion and the peripheral region thereof. Moreover, the retainer is capable of retaining the large lid portion at the first open end. With this configuration, during vehicle manufacture, the large lid portion can be held in a state where the external connection portion of the cell group is largely exposed. Thus, connection with the adjacent cell group and connection work with the external electrical wire connected to a device such as an inverter can be performed by securing a wide work space with good workability.

Furthermore, the battery wiring module includes the small lid portion constituted by a part of the large lid portion and rotatably attached to the large lid portion via the second hinge portion to cover the external connection portion. With this configuration, during vehicle maintenance, it is possible to open only the small lid portion without opening the large lid portion, thereby suppressing touching of the operator or the like on the exposed external connection portion that can be a live portion. As a result, it is possible to achieve improvement in safety during vehicle maintenance and improvement in workability during vehicle manufacture in a compatible manner.

(2) It is preferable that the retainer includes an urging arm whose opposite end portions are linked to the fixing portion and the large lid portion, the urging arm being configured to exert an urging force between the fixing portion and the large lid portion, the urging arm is elastically deformable due to rotational displacement of the large lid portion with respect to the fixing portion, and the urging arm undergoes tensile deformation until passing an intermediate position between the first closed end and the first open end, and after passing the intermediate position, the urging arm elastically recovers such that the urging arm exerts the urging force urging the large lid portion toward the fixing portion to retain the large lid portion at the first open end.

The retainer includes the elastically deformable urging arm, and the urging arm is elastically deformed due to the rotational displacement of the large lid portion with respect to the fixing portion. This urging arm has a leaf spring function, and the urging arm elastically recovers when the large lid portion passes the intermediate position between the first closed end and the first open end. Therefore, when the large lid portion is located at the first open end, the shape of the urging arm is maintained, and the external connection portion and the peripheral region thereof can be held in a state of being exposed to the outside.

(3) It is preferable that the urging arm has an L-letter shape in which a side linked to the fixing portion and a side linked to the large lid portion are orthogonal to each other. By appropriately setting the shape of the urging arm, the leaf spring function of the urging arm can be favorably exhibited. Accordingly, in the state where the large lid portion is located at the first open end, it is possible to easily maintain the exposed state of the external connection portion and the peripheral region thereof.

(4) It is preferable that a linking portion of the urging arm to the large lid portion is located inside in a height direction with respect to an outer surface of the large lid portion, and the urging arm has a curved shape that is convex outward in the height direction. By appropriately setting the shape of the urging arm, the leaf spring function of the urging arm can be favorably exhibited. Accordingly, in the state where the large lid portion is located at the first open end, it is possible to easily maintain the exposed state of the external connection portion and the peripheral region thereof. In particular, by setting the linking portion of the urging arm to the fixing portion and the large lid portion inside in the height direction with respect to the outer surface of the large lid portion, the projecting dimension of the urging arm from the cover portion can be minimized as well.

(5) It is preferable that the retainer includes a thin-plate portion whose opposite end portions are linked to the fixing portion and the large lid portion, the thin-plate portion constituting a butterfly hinge that is elastically deformable due to rotational displacement of the large lid portion with respect to the fixing portion, in a state where the large lid portion is located at the first closed end, the thin-plate portion is curved to be convex outward in a height direction, and the large lid portion is configured to be held at the first open end by the thin-plate portion being elastically deformed such that a direction of curve of the thin-plate portion is reversed. The retainer includes the thin-plate portion constituting the elastically deformable butterfly hinge, and is capable of retaining the large lid portion at either the first closed end or the first open end depending on the direction in which the thin-plate portion is curved. This makes it possible to stably switch between the covered state and the exposed state of the external connection portion and the peripheral region thereof by the large lid portion.

(6) It is preferable that the retainer includes an engaging projection portion located on a side of the first hinge portion while projecting from the large lid portion, and an engage target portion provided on a side of the case, and when the large lid portion is located at the first open end, the engaging projection portion is brought into pressure contact and engaged with the engage target portion such that the large lid portion is held at the first open end. Since a physical engaging force (a pressure contact force) between the engaging projection portion and the engage target portion can be utilized as the retaining force of the large lid portion to the first open end, the large lid portion can be stably held at the first open end. Moreover, since the engaging projection portion is located on the first hinge portion side, the engaging projection portion can be engaged with the engage target portion on the case side while suppressing the projecting height, which also contributes to downsizing. The engage target portion can be constituted by using any member on the case side as long as the member can be engaged with the engaging projection portion. For example, the terminating bus bar, the wall portion of the case, or the like may be used.

(7) It is preferable that the external connection portion is configured to be connected to a conductor, and in a state where the small lid portion is located at the second closed end, a gap is formed between the small lid portion and the case, and the small lid portion is held at the second closed end with the conductor extending from the gap to an outside. After connecting an electric wire or a bus bar to the external connection portion, the small lid portion can be held at the second closed end, thereby stably taking measures against electric shock of the external connection portion. Besides, in the state where the small lid portion is located at the second closed end, the conductor such as the electric wire and the bus bar extending from the external connection portion to the outside is inhibited from being pinched between the small lid portion and the case and get damaged.

(8) It is preferable that the small lid portion is permitted to be displaced toward a side of the second open end by elastic deformation of the second hinge portion, while the small lid portion is configured to be held on a side of the second closed end by an elastic recovery force of the second hinge portion. Since the small lid portion can be held on the second closed end side by utilizing the second hinge portion, the safety of the external connection portion can be further improved.

Details of Embodiments of the Present Disclosure

Specific examples of the battery wiring module of the present disclosure will be described below with reference to the drawings. The present disclosure is not limited to these examples, but is indicated by the scope of the claims, and all changes that come within the meaning and range of equivalency of the claims are intended to be embraced therein.

Embodiment 1

Hereinafter, a battery wiring module 10 according to Embodiment 1 of the present disclosure will be described with reference to FIGS. 1 to 8. As shown in FIG. 1, for example, in an electric automobile or the like, the battery wiring module 10 is mounted on a cell group 14 in which a plurality of cells 12 are arranged side by side. In addition, FIG. 2 and the following drawings show the battery wiring module 10 by extracting a part A in FIG. 1, which is the principal part of the present disclosure, and show the connected portion between the terminal portion of a cell group 14 and the battery wiring module 10. In the following description, the specific structure of the part A in FIG. 1 will be described in detail, and the portion other than the part A in FIG. 1 will be described only briefly. Here, the structure of the battery wiring module 10 other than the part A in FIG. 1 is not limited. Further, the specific shape of the entire battery wiring module 10 is designed according to the arrangement mode of the plurality of cells 12, and is not limited to the mode shown in FIG. 1. Besides, the orientation of the battery wiring module 10 when mounted on a vehicle is not limited, but in the following description, the upper side refers to the upper side in FIG. 5, the lower side refers to the lower side in FIG. 5, and the left side refers to the upper side in FIG. 3, the right side refers to the lower side in FIG. 3, the front side refers to the left side in FIG. 3, and the rear side refers to the right side in FIG. 3.

Battery Wiring Module 10

The battery wiring module 10 is provided with a plurality of bus bars 18 including a terminating bus bar 18a having an external connection portion 16, and electrically connects the plurality of adjacent cells 12, 12, which constitute the cell group 14, to each other. Further, the battery wiring module 10 includes a case 20 of insulation accommodating the plurality of bus bars 18 including the terminating bus bar 18a, and a cover portion 22 mounted on the case 20 and covering the plurality of bus bars 18 including the terminating bus bar 18a.

Terminating Bus Bar 18a

Figure 4:
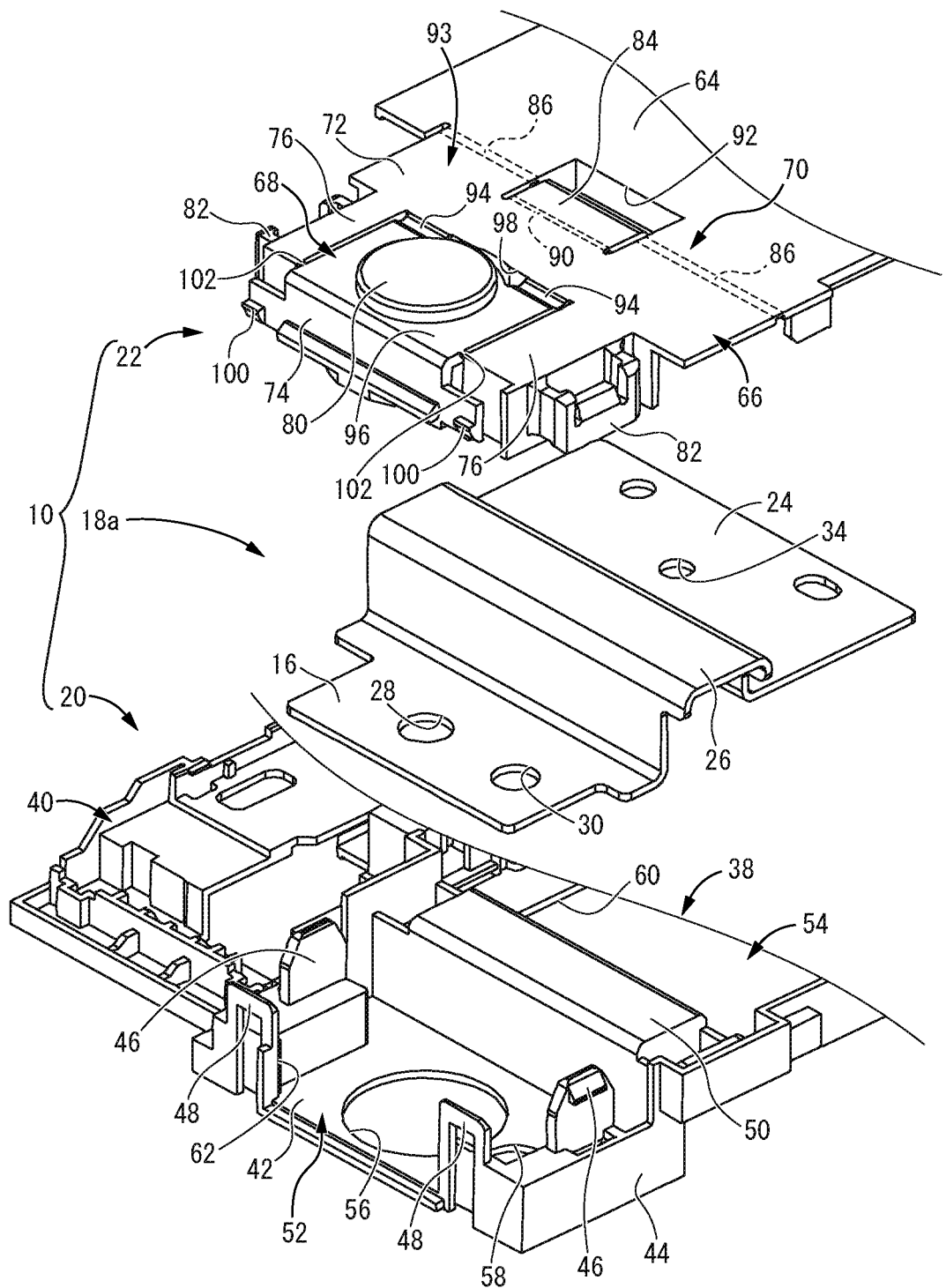
FIG. 4 is an exploded perspective view of the battery wiring module shown in FIG. 2.

The terminating bus bar 18a is connected to the cells 12 located at the opposite ends of the cell group 14 arranged in parallel, and has the external connection portion 16. As shown in FIG. 4, the terminating bus bar 18a extends in the front-rear direction overall, and is made of a metal such as aluminum. The terminating bus bar 18a is formed by, for example, bending a blank metal plate into a predetermined shape by press working or the like. In Embodiment 1, the external connection portion 16 having an approximately rectangular shape is provided in the front portion, and a battery connection portion 24 having an approximately rectangular shape is provided in the rear portion. The external connection portion 16 and the battery connection portion 24 each extend in the horizontal direction (the direction orthogonal to the vertical direction), and the external connection portion 16 and the battery connection portion 24 are remote from each other in the front-rear direction. The external connection portion 16 and the battery connection portion 24 are linked to each other by an approximately U-shaped linking portion 26 opening downward.

Figure 5:
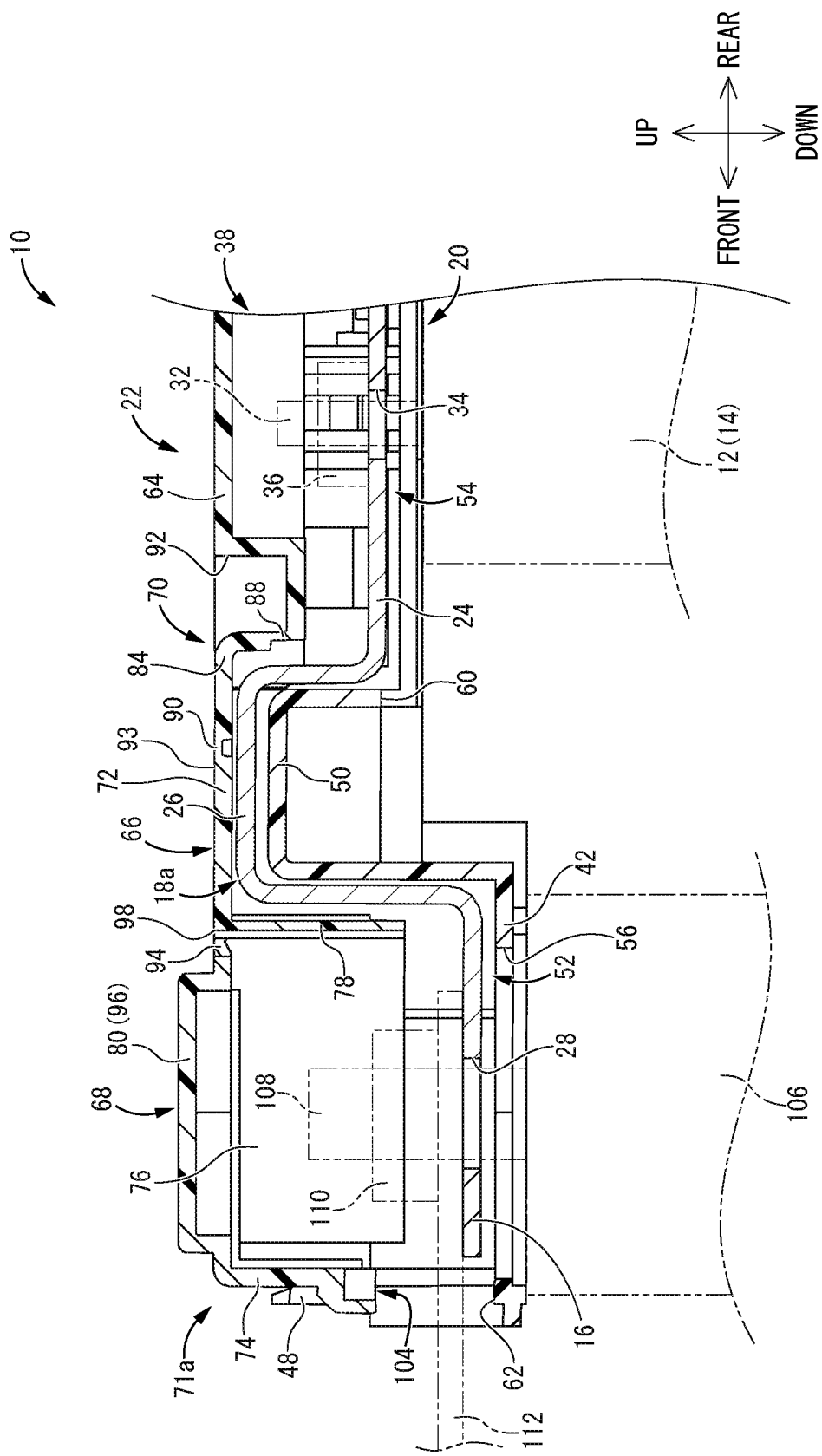
FIG. 5 is a cross sectional view taken along line 5-5 of FIG. 3.

The external connection portion 16 is penetrated by a bolt insertion hole 28 in the plate thickness direction (the vertical direction) at its approximately central portion. Further, the external connection portion 16 is penetrated by a pin insertion hole 30 in the plate thickness direction (the vertical direction) at a position away from the bolt insertion hole 28 (on the right side in Embodiment 1). As shown in FIG. 5, the battery connection portion 24 is penetrated by an electrode terminal insertion hole 34 at its approximately central portion, through which an electrode terminal 32 of the cell 12 is inserted. As will be described later, the battery connection portion 24 is exposed downward from the case 20. By the electrode terminal 32 being inserted through the electrode terminal insertion hole 34 from below and by a nut 36 being fastened, the cell 12 and the terminating bus bar 18a are configured to be electrically connected to each other. The electrical connection between the cell and the bus bar 18 (the terminating bus bar 18a) is not limited to the one by fastening, but they can be electrically connected by any conventionally known method.

In the portion other than the part A in FIG. 1 of the battery wiring module 10, the plurality of bus bars 18 having battery connection portions at the opposite ends are provided in the front-rear direction. The cells 12, 12 that are adjacent in the front-rear direction are linked to each other by each bus bar 18. Each of the bus bars 18 linking the cells 12, 12 is electrically connected to the terminating bus bar 18a accommodated in a terminating bus bar accommodating portion 38 of the case 20, which will be described later. With this configuration, the cells 12 are electrically connected.

Case 20

The case 20 has an approximately rectangular shape in plan view and is formed of synthetic resin or the like having insulation properties. The case 20 includes terminating bus bar accommodating portions 38 at the opposite end sides in the longitudinal direction (the front end side and the rear end side) in which the terminating bus bars 18a are accommodated, and a wiring accommodating portion 40 in which the wiring such as an electrical wire and an FPC (not shown), which are connected to the plurality of bus bars 18 including the terminating bus bar 18a, is accommodated. In Embodiment 1, in the case 20, the wiring accommodating portion 40 is provided on the left side of the terminating bus bar accommodating portion 38. Further, the case 20 includes a bottom wall 42 and a peripheral wall 44 projecting upward from the outer peripheral end portion of the bottom wall 42. The bottom wall 42 and the peripheral wall 44 include a convex portion and a claw portion projecting to the inside of the case 20. For example, by a concave portion being provided to each bus bar 18 including the terminating bus bar 18a and the FPC accommodated in the wiring accommodating portion 40, and the convex portion being fitted to the concave portion or the concave portion being locked by the claw portion, the bus bar 18 (the terminating bus bar 18a), the electric wire, the FPC, and the like are fixed to the case 20.

In the entire battery wiring module 10 including the portion other than the part A in FIG. 1, a single case 20 extending long in the front-rear direction is provided, and the plurality of bus bars 18 are accommodated in the front-rear direction. Inside the case 20, a partition wall is provided between the bus bars 18, 18 that are adjacent in the front-rear direction so that the bus bars 18, 18 do not come into contact with each other. Besides, a locking portion and/or a locked portion is provided on the outer surface of the peripheral wall 44, and a plurality of locking portions and locked portions are provided in the front-rear direction in the entire case 20. As will be described later, the cover portion 22 include a locked portion that engages with the locking portion of the case 20 and a locking portion that engages with the locked portion of the case 20. By the locking portions and the locked portions engaging with each other, the cover portion 22 is fixed to the case 20.

As shown in FIG. 4 and the like, in the part A of the battery wiring module 10, claw-shaped first locking portions 46, 46 are provided on the left and right opposite sides of an external-side accommodating portion 52, which will be described later, while at the front of the external-side accommodating portion 52, frame-shaped second locked portions 48, 48 are provided on the left and right opposite sides of a front opening portion 62, which will be described later.

The terminating bus bar accommodating portion 38 has a shape approximately corresponding to the terminating bus bar 18a, and a linking projection portion 50 that enters the linking portion 26 of the terminating bus bar 18a is provided at the intermediate portion in the front-rear direction of the terminating bus bar accommodating portion 38 on the bottom wall 42. That is, in the terminating bus bar accommodating portion 38, the front portion comprises the external-side accommodating portion 52 in which the external connection portion 16 is accommodated, while the rear portion comprises a battery-side accommodating portion 54 in which the battery connection portion 24 is accommodated. The external-side accommodating portion 52 and the battery-side accommodating portion 54 are linked by the linking projection portion 50.

The bottom wall 42 of the external-side accommodating portion 52 is penetrated by a bolt insertion hole 56 in the plate thickness direction (the vertical direction) at its approximately central portion. The bolt insertion hole 56 is formed to have a larger inner diameter dimension than that of the bolt insertion hole 28 provided to the external connection portion 16. Further, a pin insertion hole 58 is formed on the bottom wall 42 of the external-side accommodating portion 52 at a position corresponding to the pin insertion hole 30 of the external connection portion 16, that is, on the right side of the bolt insertion hole 56. The battery-side accommodating portion 54 is not provided with the bottom wall 42, and the battery connection portion 24 of the terminating bus bar 18a accommodated in the battery-side accommodating portion 54 is exposed to the lower side of the case 20 through a lower opening portion 60. Moreover, a notch-shaped front opening portion 62 is provided in the front portion of the peripheral wall 44 of the external-side accommodating portion 52, and the external-side accommodating portion 52 opens forward through the front opening portion 62.

Cover Portion 22

The cover portion 22 is formed of synthetic resin or the like having insulation properties, and is configured to be fixed to the case 20 in a state of covering the terminating bus bar accommodating portion 38 of the case 20. That is, in the entire battery wiring module 10 including the portion other than the part A in FIG. 1, the cover portion 22 extends long in the front-rear direction. As described above, the cover portion 22 includes the locked portion that engages with the locking portion of the case 20 and the locking portion that engages with the locked portion of the case 20. In particular, in the entire cover portion 22, the intermediate portion in the front-rear direction comprises a fixing portion 64 that is fixedly mounted on the case 20. Then, the part A in FIG. 1, which is the front end portion of the entire cover portion 22, includes a large lid portion 66 that is attached to the fixing portion 64 and covers the external connection portion 16 of the terminating bus bar 18a and the peripheral region of the external connection portion 16, and a small lid portion 68 that is constituted by a part of the large lid portion 66 and covers the external connection portion 16. The fixing portion 64 has a thin-plate shape, for example, and includes a locking portion and/or a locked portion on the opposite sides in the left-right direction.

Large Lid Portion 66

Figure 7:
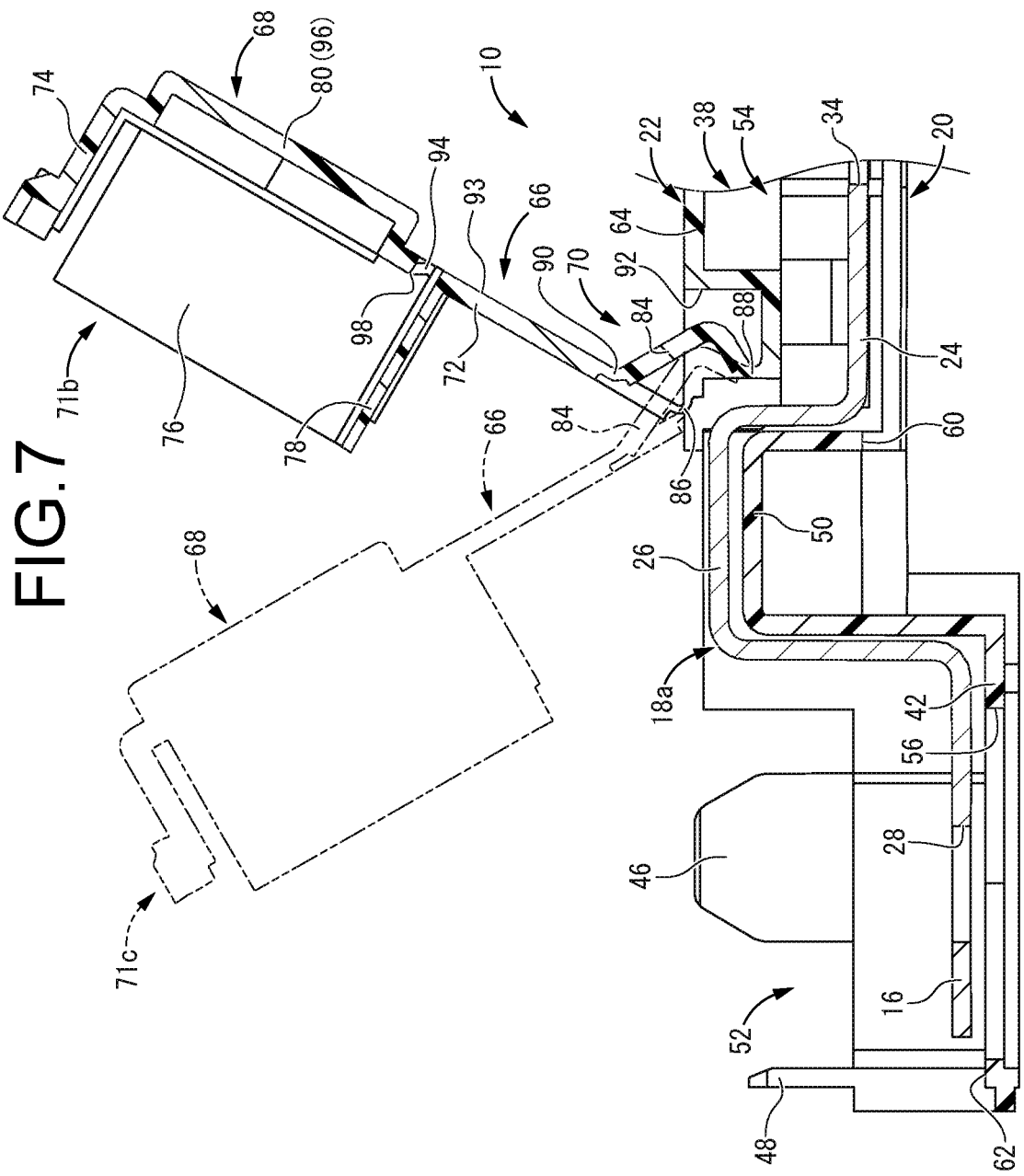
FIG. 7 is a vertical cross-sectional view showing the battery wiring module shown in FIG. 2 in a state where the large lid portion is held at a first open end, corresponding to FIG. 5.

The large lid portion 66 is attached to the front of the fixing portion 64 via a first hinge portion 70. The large lid portion 66 is rotatable around the first hinge portion 70 with respect to the fixing portion 64, and is rotatable from a first closed end 71a covering the external connection portion 16 and the peripheral region of the external connection portion 16, to a first open end 71b exposing the external connection portion 16 and the peripheral region of the external connection portion 16. That is, the state shown in FIG. 5 is a state where the large lid portion 66 is located at the first closed end 71a and covers the external connection portion 16 and the peripheral region of the external connection portion 16. Besides, the state shown in FIG. 7 is a state where the large lid portion 66 is located at the first open end 71b after rotation, and exposes the external connection portion 16 and the peripheral region of the external connection portion 16. In particular, the battery wiring module 10 has a retainer configured to retain the large lid portion 66 in a state of being located at the first open end 71b shown in FIG. 7.

The large lid portion 66 has a shape that can cover the periphery of the external connection portion 16 from above. In a state shown in FIG. 5 where the large lid portion 66 is located at the first closed end 71a, the large lid portion 66 includes a large upper wall portion 72 that covers the upper part of the external connection portion 16, and a front wall portion 74 extending downward from the from the front end of the large upper wall portion 72, a pair of side wall portions 76, 76 extending downward from the left and right opposite ends of the large upper wall portion 72, and a rear wall portion 78 extending downward from the large upper wall portion 72 to cover the rear of the external connection portion 16. The large upper wall portion 72 has a thin-plate shape having a thickness dimension approximately equal to that of the fixing portion 64, and extends forward from the fixing portion 64 via the first hinge portion 70. In the front end portion of the large upper wall portion 72, a cylindrical portion 80 projecting upward is provided at the center in the left-right direction, and a large space covered by the large lid portion 66 is obtained. Further, on the outer surface of the side wall portions 76, 76, first locked portions 82, 82 of approximately frame shape that engage with the first locking portions 46, 46 in the case 20 are provided. In a state shown in FIG. 5 where the large lid portion 66 is located at the first closed end 71a, the rear wall portion 78 is located forward with respect to the linking portion 26 of the terminating bus bar 18a. As will be described later, the rear wall portion 78 prevents tools and the like from coming into contact with the linking portion 26 of the terminating bus bar 18a even when the small lid portion 68 is opened during work such as during vehicle maintenance.

First Hinge Portion 70

In Embodiment 1, the first hinge portion 70 includes an elastically deformable urging arm 84 (see FIG. 5) provided at the central portion in the left-right direction of the cover portion 22, and thin-walled portions 86, 86 (see FIG. 6) on the opposite sides in the left-right direction of the urging arm 84. The opposite end portions in the front-rear direction of the urging arm 84 are connected to the fixing portion 64 and the large lid portion 66 (the large upper wall portion 72), and the urging arm 84 is configured to exert an urging force between the fixing portion 64 and the large lid portion 66, as will be described later. A thin-walled section 88 is formed at the linking portion between the urging arm 84 and the fixing portion 64, and a thin-walled section 90 is formed at the linking portion between the urging arm 84 and the large lid portion 66 (the large upper wall portion 72). The thin-walled portions 86, 86 on the opposite sides in the left-right direction of the urging arm 84 are located at the intermediate portion in the front-rear direction of the thin-walled sections 88, 90 located on the opposite sides in the front-rear direction of the urging arm 84. That is, the thin-walled portions 86 are located rearward with respect to the front thin-walled section 90 and forward with respect to the rear thin-walled section 88. With this configuration, the large lid portion 66 can deform so as to bend rearward at the thin-walled portions 86, 86 and at the thin-walled sections 88, 90 with respect to the fixing portion 64. Further, the urging arm 84 is elastically deformable due to the rotational displacement of the large lid portion 66 with respect to the fixing portion 64.

In the cover portion 22, at the rear of the urging arm 84, a deformation permitting space 92 that permits deformation of the urging arm 84 is provided. That is, in the cover portion 22, the deformation permitting space 92 having a concave shape is formed at the rear of the urging arm 84, and as shown in FIG. 5, in the state where the large lid portion 66 is located at the first closed end 71a, the urging arm 84 rises upward from the front end portion of the deformation permitting space 92 via the thin-walled section 88. Besides, in the state where the large lid portion 66 is located at the first closed end 71a, the urging arm 84 extends rearward from the rear end portion of the large lid portion 66 (the large upper wall portion 72) via the thin-walled section 90. With this configuration, in Embodiment 1, the thin-walled section 90, which is the linking portion between the urging arm 84 and the large lid portion 66, is at the same position as an outer surface 93 of the large lid portion 66 in the height direction (the vertical direction), and the urging arm 84 has an L-letter shape in which the side linked to the fixing portion 64 and the side linked to the large lid portion 66 are orthogonal to each other. Therefore, in Embodiment 1, the first hinge portion 70 is a so-called three-point hinge, and has a plurality of stable positions. Thus, the large lid portion 66 is configured to be held at any one of the stable positions due to the rotational displacement around the first hinge portion 70. In Embodiment 1, the urging arm 84 is molded to have an L-letter shape, and the state where the angle of intersection between the side linked to the fixing portion 64 and the side linked to the large lid portion 66 is 90 degrees is a stable state.

Small Lid Portion 68

Figure 6:
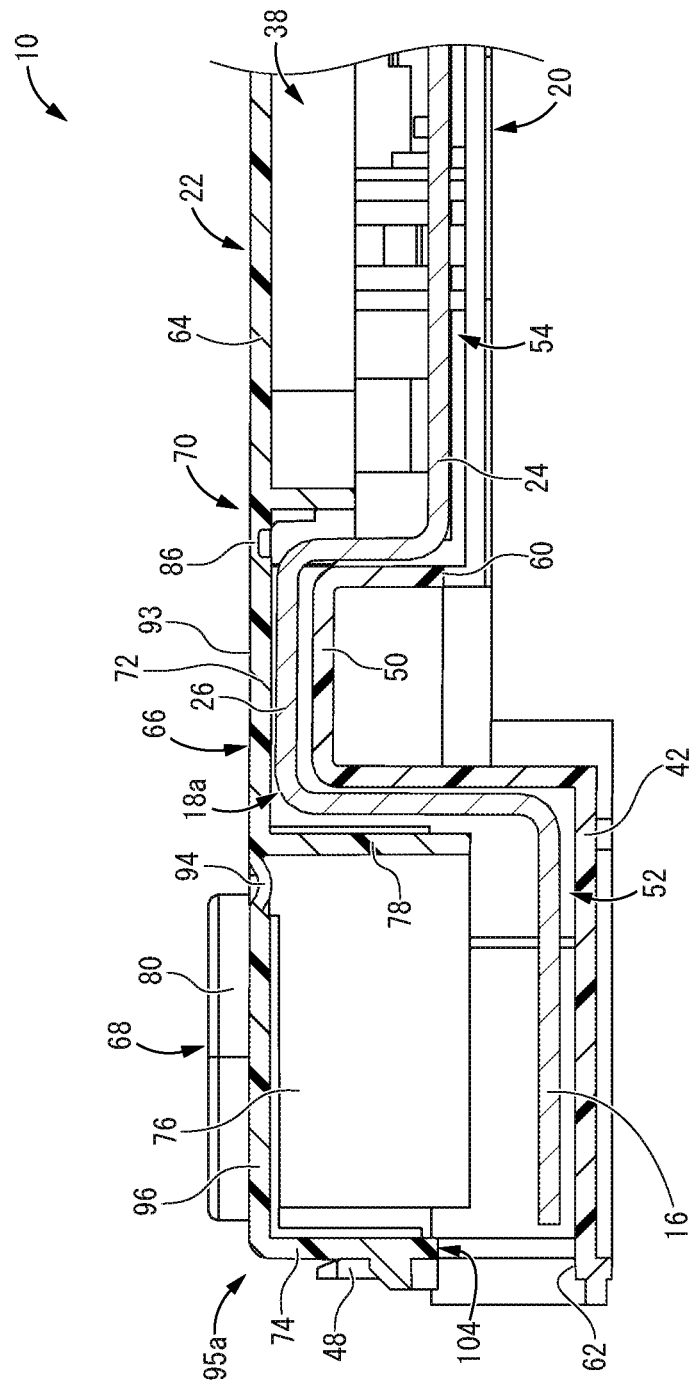
FIG. 6 is a cross sectional view taken along line 6-6 of FIG. 3.
Figure 8:
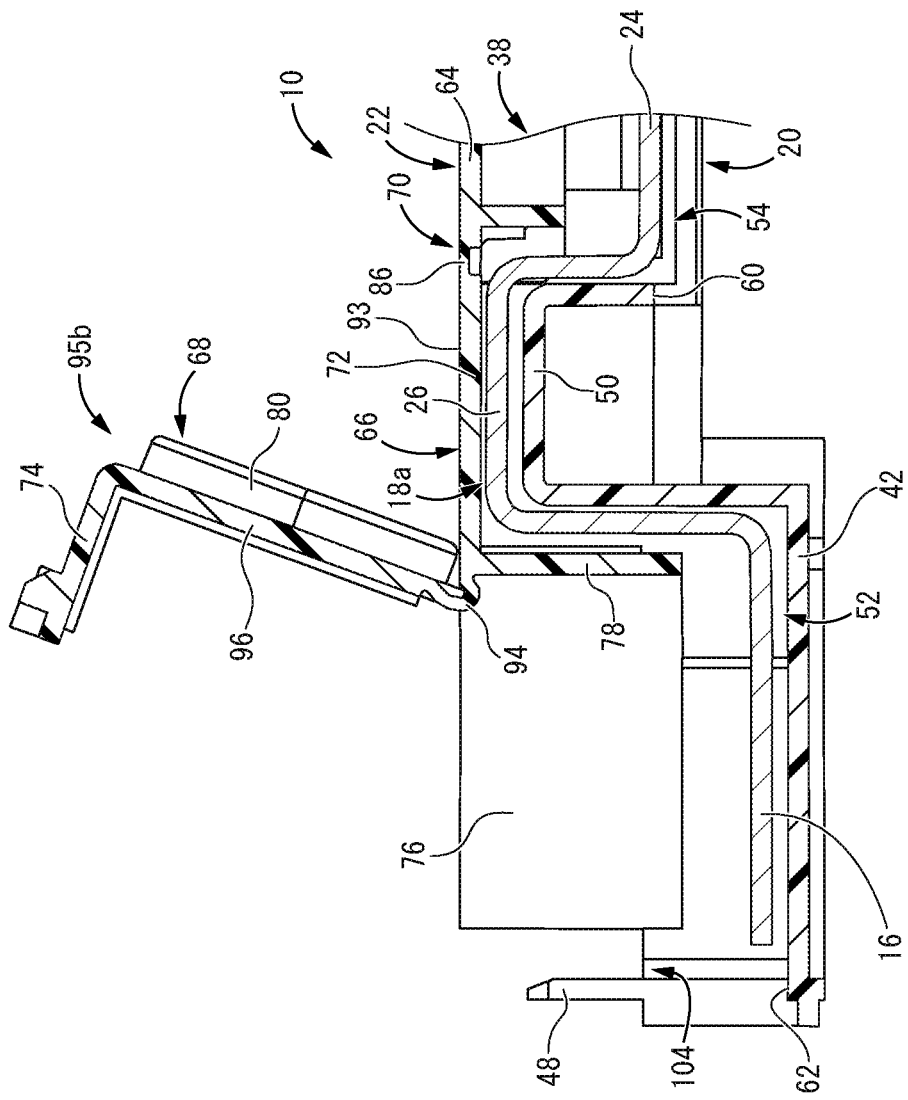
FIG. 8 is a vertical cross-sectional view showing the battery wiring module shown in FIG. 2 in a state where the small lid portion is located at a second open end, corresponding to FIG. 6.

The small lid portion 68 is attached to the large upper wall portion 72 of the large lid portion 66 via a second hinge portion 94. The small lid portion 68 is rotatable around the second hinge portion 94 with respect to the large lid portion 66 (the large upper wall portion 72), and is rotatable from a second closed end 95a covering the external connection portion 16, to a second open end 95b exposing the external connection portion 16. That is, the state shown in FIG. 6 is a state where the small lid portion 68 is located at the second closed end 95a and covers the external connection portion 16. Besides, the state shown in FIG. 8 is a state where the small lid portion 68 is located at the second open end 95b after rotation, and exposes the external connection portion 16.

As described above, the small lid portion 68 is constituted by a part of the large lid portion 66. Specifically, the small lid portion 68 includes a small upper wall portion 96 comprising a part of the large upper wall portion 72, and the front wall portion 74. That is, in the front portion of the large upper wall portion 72, the intermediate portion in the left-right direction comprises the small upper wall portion 96, and the small upper wall portion 96 is remote from the rear portion of the large upper wall portion 72 and from the opposite end portions in the left-right direction of the front portion of the large upper wall portion 72 by a gap 98 of a predetermined size. The small upper wall portion 96 is linked to the rear portion of the large upper wall portion 72 by the second hinge portion 94. With this configuration, the small upper wall portion 96 can be rotationally displaced with respect to the rear portion of the large upper wall portion 72. The aforementioned cylindrical portion 80 is formed on the small upper wall portion 96. Besides, at the opposite end portions in the left-right direction of the front wall portion 74, an approximately claw-shaped second locking portion 100 that engages with the second locked portion 48 in the case 20 is provided.

Figure 2:
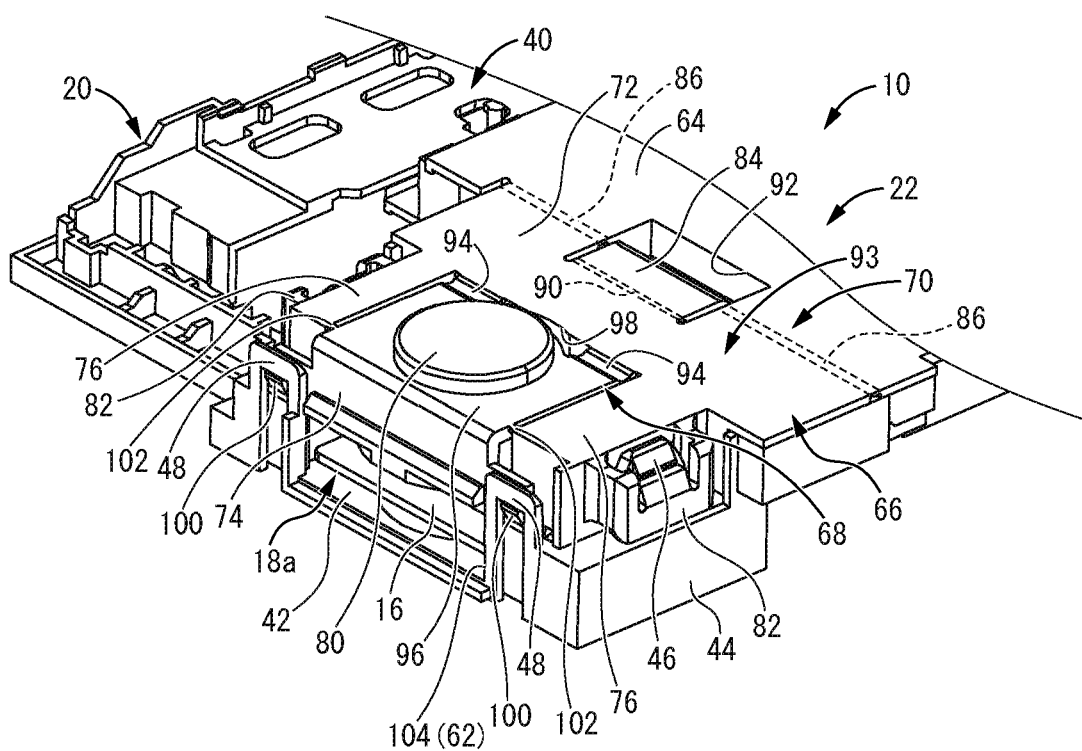
FIG. 2 is an enlarged perspective view showing a principal part of a part A of the battery wiring module shown in FIG. 1 in a state where a large lid portion and a small lid portion are respectively located at a first closed end and a second closed end.
Figure 3:
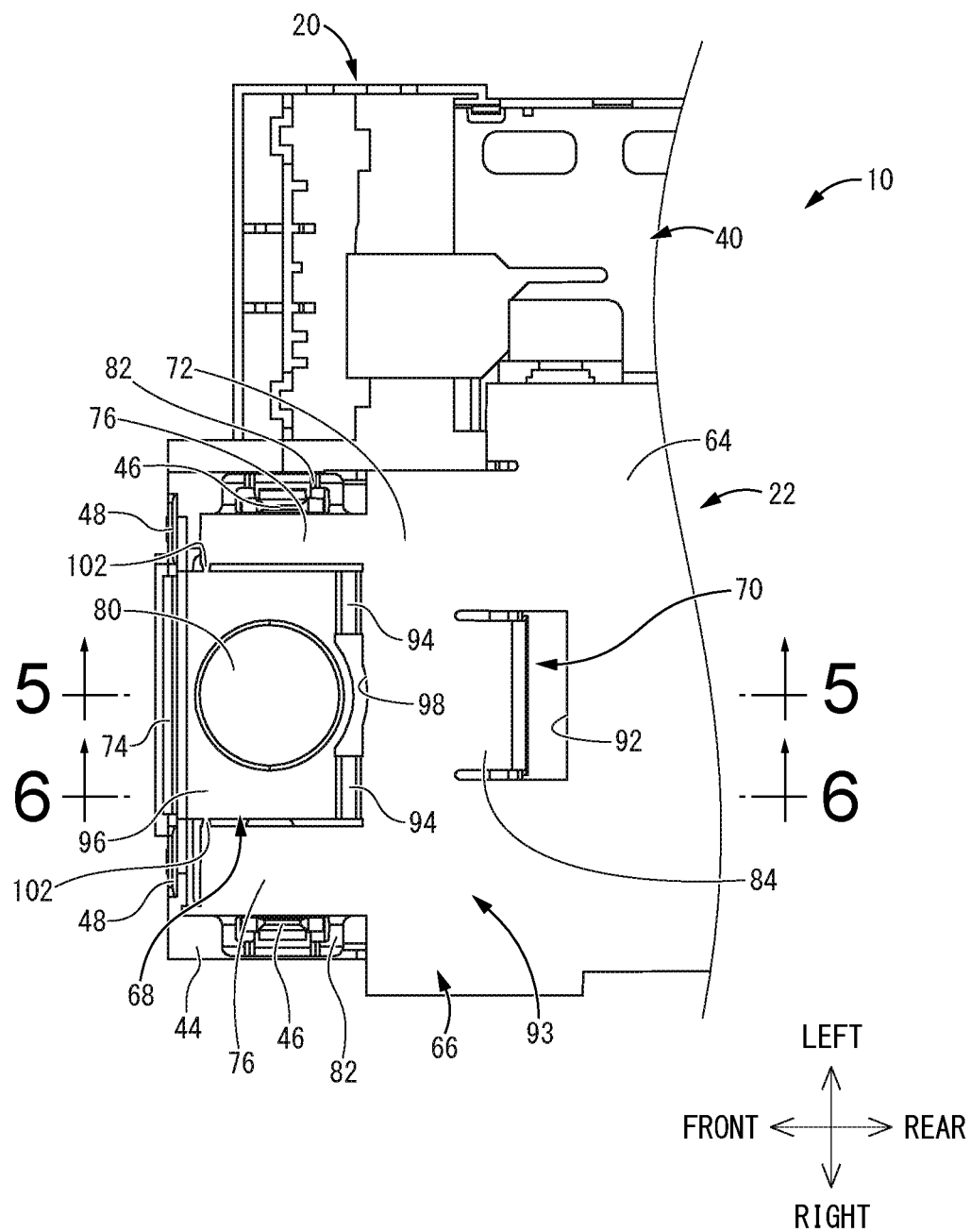
FIG. 3 is a plan view of the battery wiring module shown in FIG. 2.

In the initial state shown in FIG. 2 and the like, the small upper wall portion 96 is configured to rotate integrally with the large upper wall portion 72. Specifically, at the tip portion of the large upper wall portion 72, the opposite end portions in the left-right direction of the large upper wall portion 72 and the small upper wall portion 96 are linked by a thin-walled friable portion 102. This prevents the small lid portion 68 (the small upper wall portion 96) from accidentally rotating when the large lid portion 66 (the large upper wall portion 72) rotates. Then, during vehicle maintenance or the like, by applying an external force for rotating the small lid portion 68 to break the friable portion 102, it is possible to rotate the small lid portion 68 to be opened while the large lid portion 66 is closed.

Further, as shown in FIG. 2 and the like, in the state where the small lid portion 68 is located at the second closed end 95a, a gap 104 of a predetermined size is formed vertically between the front wall portion 74 of the small lid portion 68 and the bottom wall 42 of the case 20. That is, the front opening portion 62 provided in the front portion of the peripheral wall 44 of the case 20 is covered from above by the front wall portion 74 of the small lid portion 68, so that the gap 104 of approximately rectangular shape is formed.
Second Hinge Portion 94

The second hinge portion 94 linking the small upper wall portion 96 and the rear portion of the large upper wall portion 72 is formed to be thinner than the small upper wall portion 96 and the large upper wall portion 72, and is elastically deformable. In the initial state shown in FIG. 6 (the state where the small lid portion 68 is located at the second closed end 95a), the second hinge portion 94 is curved so as to be convex downward. The second hinge portion 94 is molded in a curved state that is convex downward, and with respect to the elastic deformation due to the opening movement of the small lid portion 68, which will be described later, the second hinge portion 94 is rotationally displaced, by the elastic recovering deformation, in the direction in which the small lid portion 68 automatically closes. By so doing, the small lid portion 68 is held on the side of the second closed end 95a by the elastic recovery force of the second hinge portion 94. In Embodiment 1, a pair of second hinge portions 94, 94 are provided at the opposite side portions in the left-right direction at the rear end portion of the small upper wall portion 96 so as to be remote from each other.
Assembly of Battery Wiring Module 10

Hereinafter, a specific example of the method of assembling the battery wiring module 10 will be described, but the method of assembling the battery wiring module 10 is not limited to the mode described below.

First, the plurality of bus bars 18 including the terminating bus bars 18a and the case 20 are prepared, and each bus bar 18 is fixed to the case 20 through fitting by concave and convex portions, locking by the claws, or the like. That is, as shown in FIG. 1, the plurality of bus bars 18 including the terminating bus bars 18a arranged in the front-rear direction are fixed to the case 20 which is long in the front-rear direction. When fixing the terminating bus bar 18a and the case 20, a pin (not shown) may be inserted through the pin insertion holes 30, 58 of the terminating bus bar 18a and the case 20, so that the terminating bus bar 18a and the case 20 are mutually positioned. Subsequently, the bus bars 18 including the terminating bus bars 18a and the case 20 are placed on the cell group 14 in which the cells 12 are arranged side by side. Then, the electrode terminal 32 of each cell 12 is inserted through the electrode terminal insertion hole 34 of the corresponding bus bar 18, and the nut 36 is fastened. By so doing, the cell group 14 comprising the plurality of cells 12 is linked to the intermediate portion in the front-rear direction of the case 20, and the cell 12 and the corresponding bus bar 18 are electrically connected. In this state, in the part A in FIG. 1, the front end portion of the battery wiring module 10 is positioned so as to project forward with respect to the cell group 14. As described above, the method of electrically connecting the cell and the bus bar is not limited to the fastening of bolts and nuts.

Subsequently, the cover portion 22 is attached from above to the terminating bus bar accommodating portion 38 of the case 20. Specifically, the cover portion 22 is attached to the case 20 by the locking portion and/or the locked portion provided to the outer surface of the peripheral wall 44 of the case 20 and the locked portion and/or the locking portion provided to the cover portion 22 being engaged. At this time, the first locking portion 46 and the first locked portion 82, and the second locking portion 100 and the second locked portion 48 provided to the front end portion of the battery wiring module 10 may be engaged or do not have to be engaged with each other. By attaching the cover portion 22 to the case 20 to which the cells 12 (the cell group 14) are linked in this way, the battery wiring module 10 of Embodiment 1 is completed.

The front end portion of the battery wiring module 10 to which the cell group 14 is linked to the intermediate portion in the front-rear direction as described above is placed on and fixed to a fixing member 106 such as a cabinet located in front of the cell group 14. As shown in FIG. 5, the fixing member 106 includes a fixing bolt 108 projecting upward, and the fixing bolt 108 is inserted through the bolt insertion hole 56 of the case 20 and the bolt insertion hole 28 of the external connection portion 16 of the terminating bus bar 18a, then a nut 110 is fastened thereto. By so doing, the cell group 14 is configured to be fixed to the cabinet. When the nut 110 is fastened to the fixing bolt 108, a pin (not shown) may be inserted through the pin insertion holes 30, 58 of the terminating bus bar 18a and the case 20, so that the terminating bus bar 18a and the case 20 do not integrally rotate with the nut 110.

When the front end portion of the battery wiring module 10 is fixed to the fixing member 106 in this way, the large lid portion 66 rotationally displaces around the first hinge portion 70 to be located at the first open end 71b as shown in FIG. 7, and the large lid portion 66 is held at the first open end 71b by the retainer. At that time, as described above, the small upper wall portion 96 of the small lid portion 68 is linked to opposite end portions in the left-right direction of the large upper wall portion 72 by the friable portions 102, 102. Thus, the small lid portion 68 and the large lid portion 66 integrally rotate so as to be located at the first open end 71b.

Here, the first hinge portion 70 includes the urging arm 84 at the center in the left-right direction and the thin-walled portions 86 on the opposite sides in the left-right direction of the urging arm 84. That is, the rotation fulcrum of the urging arm 84 exists in the thin-walled section 88 that is linked to the fixing portion 64, and the rotation fulcrum of the opposite side portions in the left-right direction of the urging arm 84 exists in the thin-walled portions 86, 86. The moving fulcrum of the large lid portion 66 that is pulled and moves due to the deformation of the urging arm 84 exists in the thin-walled section 90 that is the linking portion between the urging arm 84 and the large lid portion 66.

As described above, such a first hinge portion 70 is a so-called three-point hinge, and the deformation mechanism is only briefly explained. The urging arm 84 of the first hinge portion 70 is in a stable position where the angle of intersection is 90 degrees. Then, by the large lid portion 66 located at the first closed end 71a being rotationally displaced around the first hinge portion 70, the urging arm 84 undergoes tensile deformation until the urging arm 84 passes an intermediate position 71c between the first closed end 71a and the first open end 71b (shown by a chain double-dashed line in FIG. 7) due to rotational action around the thin-walled portions 86 on the left and right opposite sides or the like, and in the urging arm 84, the angle of intersection between the side linked to the fixing portion 64 and the side linked to the large lid portion 66 is made larger than 90 degrees. Then, after the large lid portion 66 passes the intermediate position 71c, the urging arm 84 elastically recovers in the direction in which the angle of intersection returns to 90 degrees, and the large lid portion 66 becomes stable at the first open end 71b as shown in FIG. 7. That is, when the large lid portion 66 is opened, the large lid portion 66 is subjected to an urging force exerted by the urging arm 84 from the intermediate position 71c toward the first open end 71b, that is, toward the fixing portion 64, and is held at the first open end 71b. Therefore, in Embodiment 1, the retainer that retains the large lid portion 66 in a state of being located at the first open end 71b shown in FIG. 7 is constituted by the urging arm 84.

By fastening the nut 110 to the fixing bolt 108 with the large lid portion 66 held in the open state in this way, the battery wiring module 10 to which the cell group 14 is linked is fixed to the fixing member 106 such as a cabinet. At that time, a conductor 112 such as a bus bar for connecting to a terminal portion provided to the end of the external electric wire or another cell group is linked to the fixing bolt 108 and the nut 110 is fastened, so that the external connection portion 16 of the terminating bus bar 18a and the conductor 112 are electrically connected. Subsequently, the large lid portion 66 is rotationally displaced around the first hinge portion 70 to be positioned at the first closed end 71a, so that the external connection portion 16 of the terminating bus bar 18a is covered and protected by the large lid portion 66. When the large lid portion 66 is closed, the large lid portion 66 is subjected to an urging force exerted by the urging arm 84 from the intermediate position 71c toward the first closed end 71a, and is held at the first closed end 71a. In particular, in a state where the large lid portion 66 is located at the first closed end 71a, by the first locking portion 46 and the first locked portion 82, and/or the second locking portion 100 and the second locked portion 48 being engaged with each other, the large lid portion 66 is more reliably held at the first closed end 71a, thereby preventing the external connection portion 16 of the terminating bus bar 18a from being accidentally exposed. In the state where the large lid portion 66 is located at the first closed end 71a, the conductor 112 electrically connected to the external connection portion 16 of the terminating bus bar 18a extends to the outside through the gap 104 between the small lid portion 68 and the case 20.

Then, during vehicle maintenance or the like, the engagement between the second locking portion 100 and the second locked portion 48 is released, and an external force in the direction of rotating around the second hinge portion 94 is exerted on the small lid portion 68, so as to break the friable portions 102, 102. This makes it possible to rotate the small lid portion 68 independently of the rear portion and the opposite end portions in the left-right direction of the large lid portion 66 due to the elastic deformation of the second hinge portion 94, so that the small lid portion 68 can rotate to reach the second open end 95b shown in FIG. 8. As a result, the external connection portion 16 of the terminating bus bar 18a can be exposed, and the maintenance work can be performed. The second hinge portion 94 is in a stable position with the small lid portion 68 located at the second closed end 95a shown in FIG. 6. By displacing the small lid portion 68 to the second open end 95b as shown in FIG. 8, the second hinge portion 94 is configured to exert an elastic recovery force on the small lid portion 68 as an urging force in the direction toward the second closed end 95a. As a result, by releasing the external force on the small lid portion 68, the small lid portion 68 automatically displaces to the second closed end 95a due to the elastic recovering action of the second hinge portion 94. Then, after the small lid portion 68 moves to the second closed end 95a, the maintenance work is completed by engaging the second locking portion 100 with the second locked portion 48. Such rotation of the small lid portion 68 around the second hinge portion 94, that is, displacement to the second open end 95b and retaining at the second closed end 95a, can be performed with the conductor 112, which is electrically connected to the external connection portion 16 of the terminating bus bar 18a, extending from the gap 104 to the outside.

According to the battery wiring module 10 of Embodiment 1 as described above, when the cell group 14 is fixed to the fixing member 106 such as a cabinet, the large lid portion 66 is rotationally displaced around the first hinge portion 70 to the first open end 71b, so that the external connection portion 16 of the terminating bus bar 18a can be largely exposed, thereby facilitating fastening operation of the nut 110 to the fixing bolt 108. In particular, in Embodiment 1, the retainer (the urging arm 84) that retains the large lid portion 66 at the first open end 71b is provided. Thus, it is not necessary for an operator to retain the large lid portion 66 in an open state, for example, thereby further improving workability. Besides, during vehicle maintenance, the small lid portion 68 is rotationally displaced to the second open end 95b independently of the large lid portion 66 around the second hinge portion 94, so that the external connection portion 16 of the terminating bus bar 18a can be exposed small. By so doing, the risk that the tool or the operator may accidentally touch the terminating bus bar 18a and receive an electric shock can be reduced. As a result, it is possible to achieve both improvement in safety during vehicle maintenance and improvement in workability during vehicle manufacture.

In the battery wiring module 10, the retainer that retains the large lid portion 66 at the first open end 71b is the urging arm 84 that constitutes a so-called three-point hinge. Therefore, it is not necessary to provide another member as a retainer for retaining the large lid portion 66 at the first open end 71b, thereby reducing the number of parts and simplifying the structure. Further, the urging arm 84 automatically moves to the first open end 71b or the first closed end 71a by passing the intermediate position, so that the labor of the operator can also be reduced.

In Embodiment 1, the urging arm 84 has an L-letter shape. The urging arm 84 extends straight rearward from the large lid portion 66, and the linking portion to the fixing portion 64 (the thin-walled section 88) is located inside with respect to the outer surface of the large lid portion 66 in the height direction (the vertical direction). With this configuration, the urging arm 84 is inhibited from projecting upward from the cover portion 22.

The conductor 112 electrically connected to the external connection portion 16 of the terminating bus bar 18a extends to the outside from the gap 104 between the front wall portion 74 of the small lid portion 68 and the bottom wall 42 in the case 20. With this configuration, the small lid portion 68 can be opened and closed with the conductor 112 extending to the outside from the gap 104. As a result, for example, the small lid portion 68 can be opened to perform maintenance work without releasing the electrical connection between the terminating bus bar 18a and the conductor 112. Further, the small lid portion 68 automatically displaces to the second closed end 95a side by releasing the external force toward the second open end 95b side due to the elastic recovery force of the second hinge portion 94. Therefore, the risk that the operator unintentionally touches the external connection portion 16 of the terminating bus bar 18a and receives an electric shock can be further reduced, and the labor of the operator for closing the small lid portion 68 can also be reduced.

Embodiment 2

Figure 9:
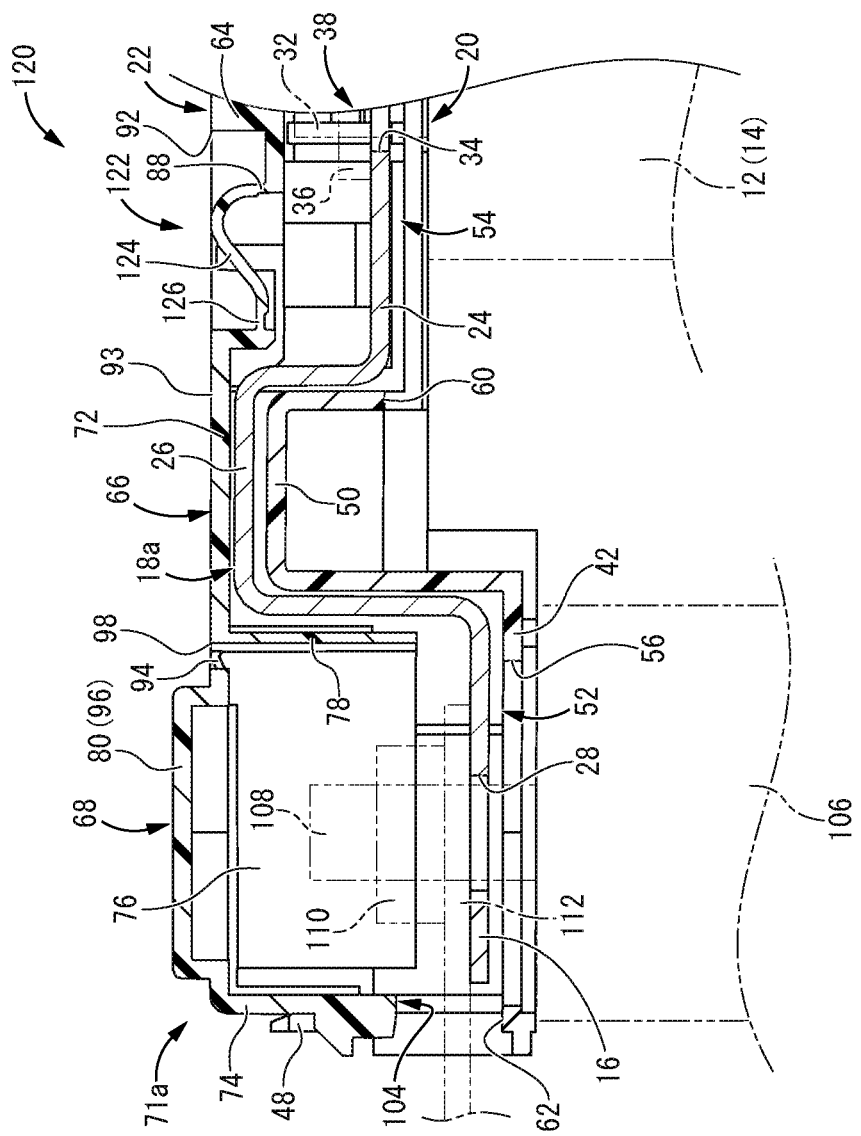
FIG. 9 is a vertical cross-sectional view showing a battery wiring module according to Embodiment 2 in a state where the large lid portion and the small lid portion are respectively located at the first closed end and the second closed end, corresponding to FIG. 5.

Hereinafter, a battery wiring module 120 according to a second embodiment of the present disclosure will be described with reference to FIGS. 9 and 10. The battery wiring module 120 of Embodiment 2 has the same basic structure as the battery wiring module 10 according to Embodiment 1. However, in comparison with the battery wiring module 10 according to Embodiment 1, in a first hinge portion 122, an urging arm 124 serving as a retainer has a different structure. In the following description, the parts different from those in the battery wiring module 10 described in Embodiment 1 will be mainly described, and the components and parts that are substantially identical with those in Embodiment 1 will be assigned like symbols in the drawings and not described in any detail.

In Embodiment 1, the thin-walled section 90, which is the linking portion between the urging arm 84 and the large lid portion 66, exists at the same height position (the position in the vertical direction) as the outer surface 93 of the large lid portion 66. However, in Embodiment 2, a thin-walled section 126, which is the linking portion between the urging arm 124 and the large lid portion 66, exists inside in the height direction (on the lower side) with respect to the outer surface 93 of the large lid portion 66. The height position of the thin-walled section 126 is set according to, for example, the amount of rotation of the large lid portion 66, an external force required for rotation, and the like, and is not limited. In Embodiment 2, the thin-walled section 126 exists at approximately the same height as the thin-walled section 88, which is the linking portion between the urging arm 124 and the fixing portion 64. The urging arm 124 links the thin-walled sections 126, 88 at the front and at the rear. In Embodiment 2, the urging arm 124 is curved so as to be convex outward in the height direction (to the upper side) in a state where the large lid portion 66 is located at the first closed end 71a (a state shown in FIG. 9).

Figure 10:
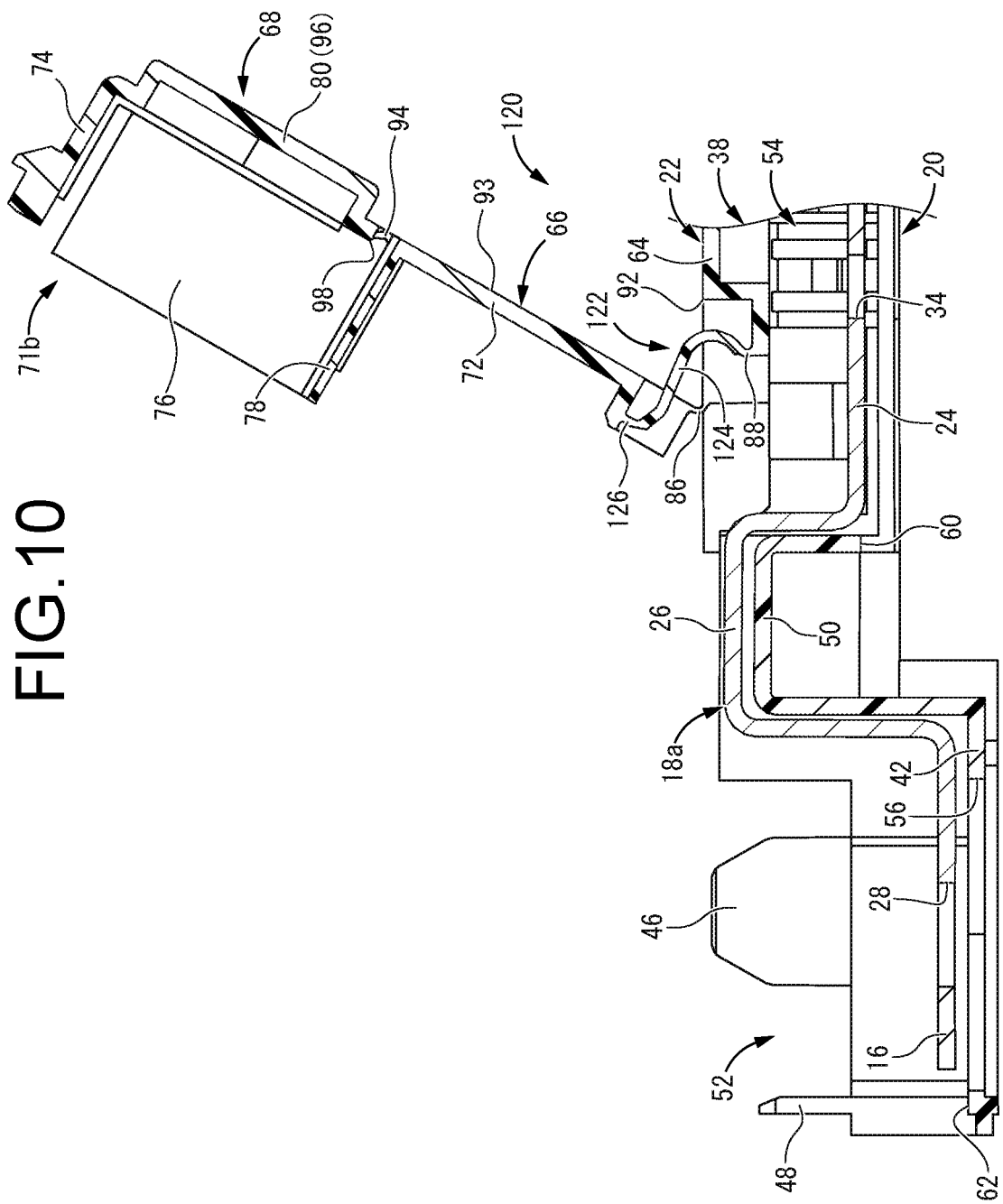
FIG. 10 is a vertical cross-sectional view showing the battery wiring module shown in FIG. 9 in a state where the large lid portion is held at the first open end.

In the battery wiring module 120 of Embodiment 2 including the urging arm 124 having such a structure as well, by the large lid portion 66 being rotationally displaced around the first hinge portion 122 to the first open end 71b, the large lid portion 66 is held in an open state by the urging arm 124 serving as the retainer as shown in FIG. 10. By so doing, the same effect as that of the battery wiring module 10 of Embodiment 1 can be exhibited in the battery wiring module 120 of Embodiment 2.

In particular, in Embodiment 2, the thin-walled sections 126, 88, which are the opposite end portions of the urging arm 124, are both located inside in the height direction (on the lower side) with respect to the outer surface 93 of the large lid portion 66. Thus, it is also possible to further suppress the upward protrusion of the urging arm 124 from the cover portion 22. Besides, by making the urging arm 124 a curved shape, it is easy to sufficiently obtain the length dimension of the urging arm 124, thereby improving the degree of freedom of design. With this configuration, the shape of the urging arm 124 can be appropriately designed according to the rotation amount of the large lid portion 66, the external force required for the rotation, and the like.

Embodiment 3

Figure 11:
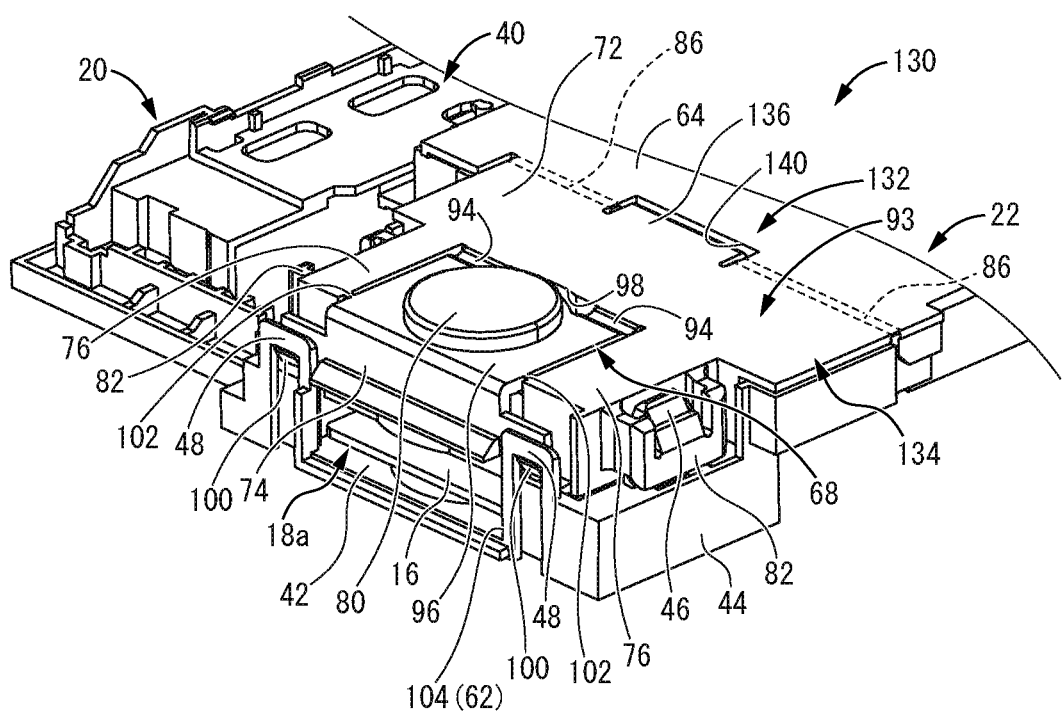
FIG. 11 is a perspective view showing a battery wiring module according to Embodiment 3 in a state where a large lid portion and the small lid portion are respectively located at the first closed end and the second closed end.
Figure 12:
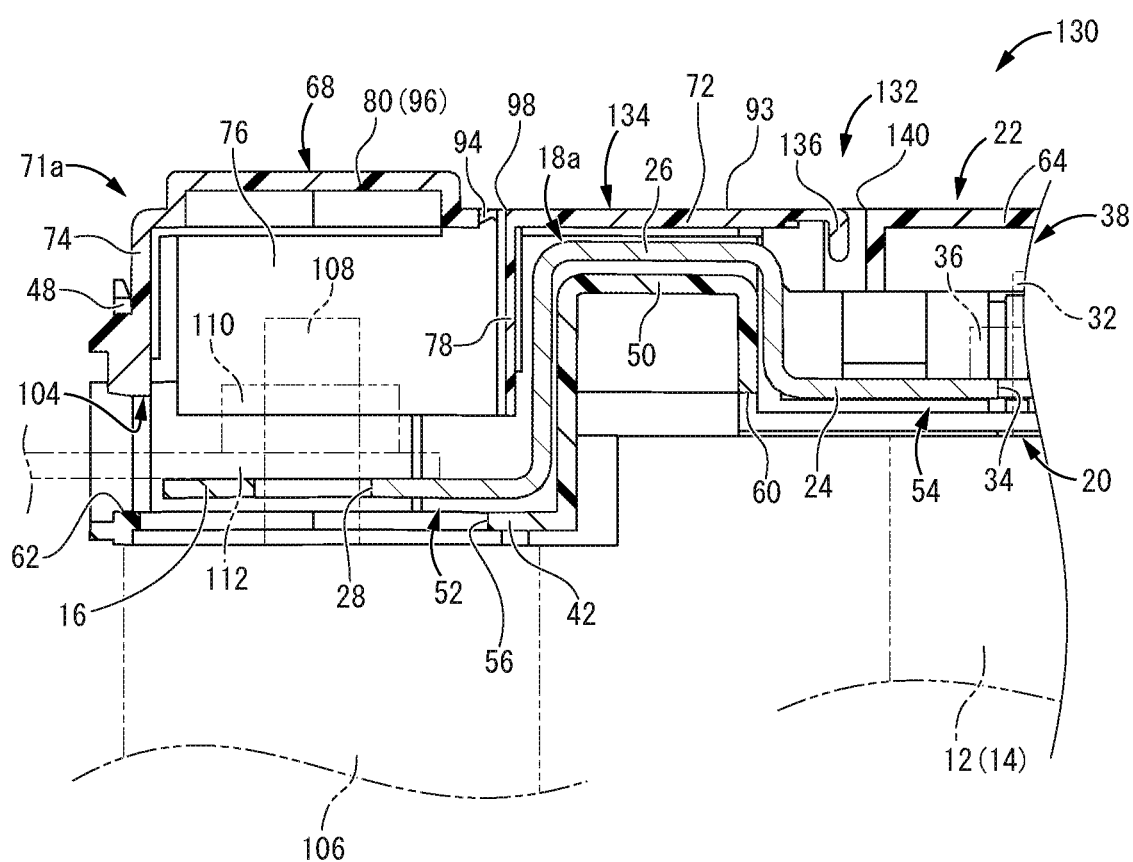
FIG. 12 is a vertical cross-sectional view of the battery wiring module shown in FIG. 11, corresponding to FIG. 5.

Hereinafter, a battery wiring module 130 according to Embodiment 3 of the present disclosure will be described with reference to FIGS. 11 to 13. In Embodiments 1 and 2, the first hinge portions 70, 122 are three-point hinges, and the retainers are the urging arms 84, 124 constituting the three-point hinge. However, in Embodiment 3, the structure of a first hinge portion 132 is different from those of the first hinge portions 70, 122 in Embodiments 1 and 2. That is, in Embodiment 3, the first hinge portion 132 includes the thin-walled portions 86, 86 that link the fixing portion 64 and a large lid portion 134 on the opposite side portions in the left-right direction of the cover portion 22.

A retainer that retains the large lid portion 134 at the first open end 71b is provided at the central portion in the left-right direction of the cover portion 22. In Embodiment 3, the retainer includes an engaging projection portion 136 projecting rearward from the large lid portion 134 and an engage target portion 138 provided on the terminating bus bar 18a, which is the member on the case 20 side. Specifically, a concave displacement permitting space 140 is provided at the central portion in the left-right direction at the front end portion of the fixing portion 64, and as shown in FIG. 12, the engaging projection portion 136 projects from the central portion in the left-right direction at the rear end portion of the large lid portion 134 toward the displacement permitting space 140. The rear end portion of the engaging projection portion 136 is bent downward, so that the engaging projection portion 136 has an approximately hook shape.

Figure 13:
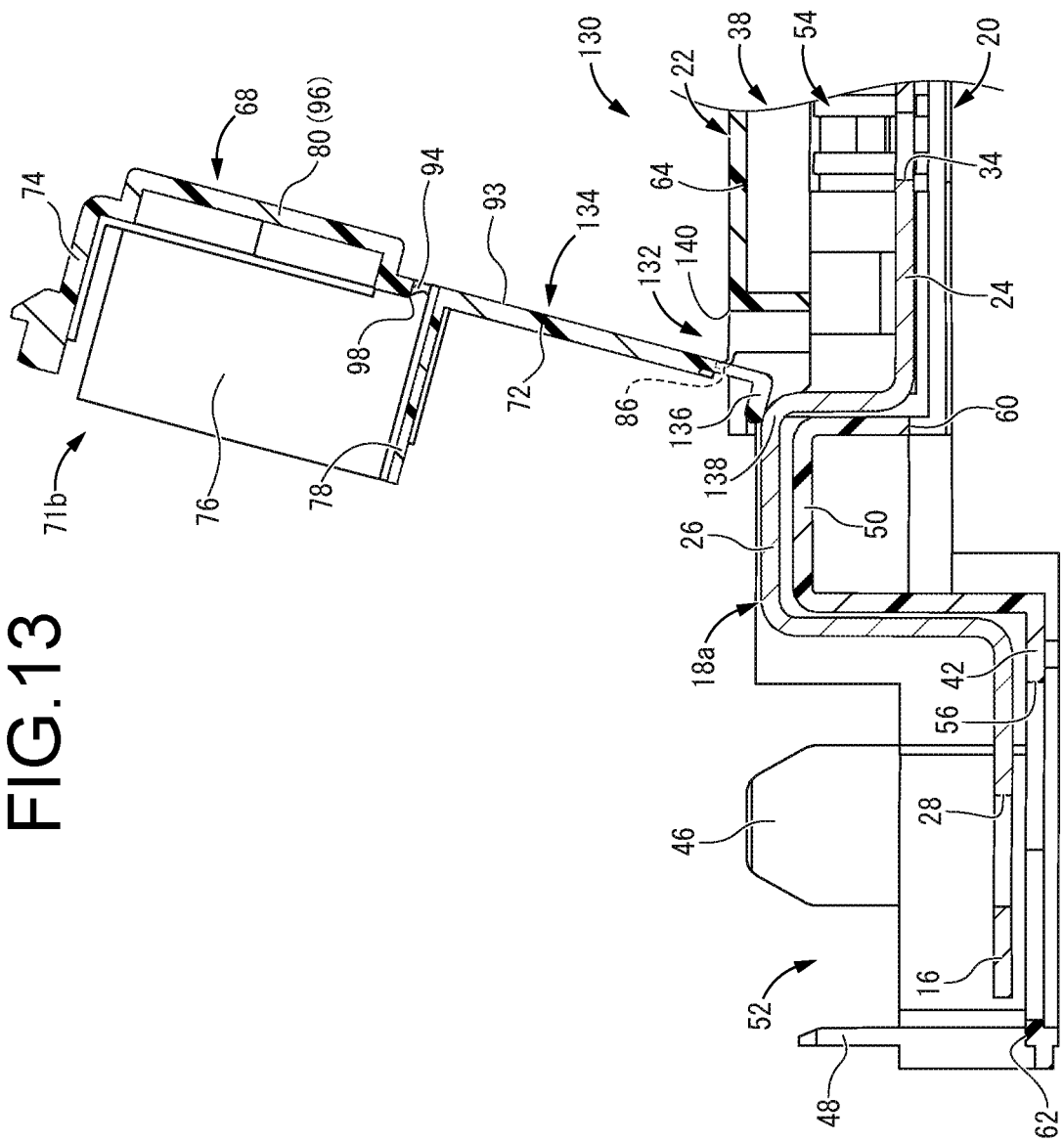
FIG. 13 is a vertical cross-sectional view showing the battery wiring module shown in FIG. 12 in a state where the large lid portion is held at the first open end.
Figure 14:
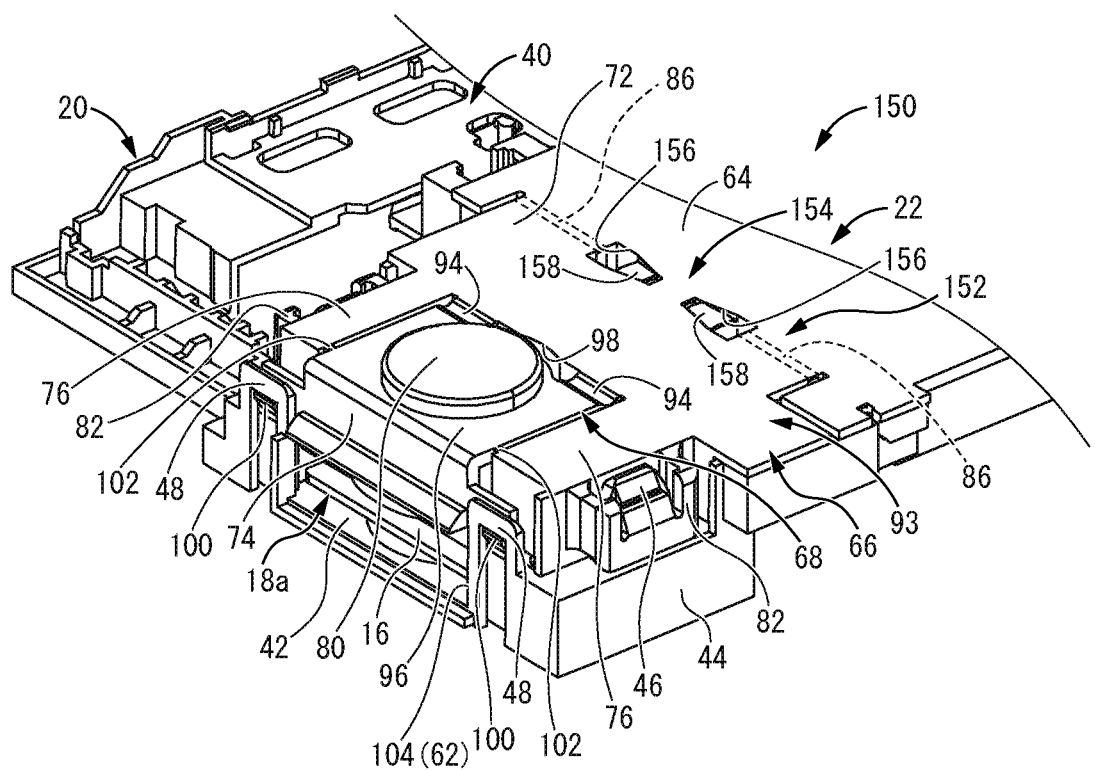
FIG. 14 is a perspective view showing a battery wiring module according to Embodiment 4 in a state where the large lid portion and the small lid portion are respectively located at the first closed end and the second closed end.
Figure 15:
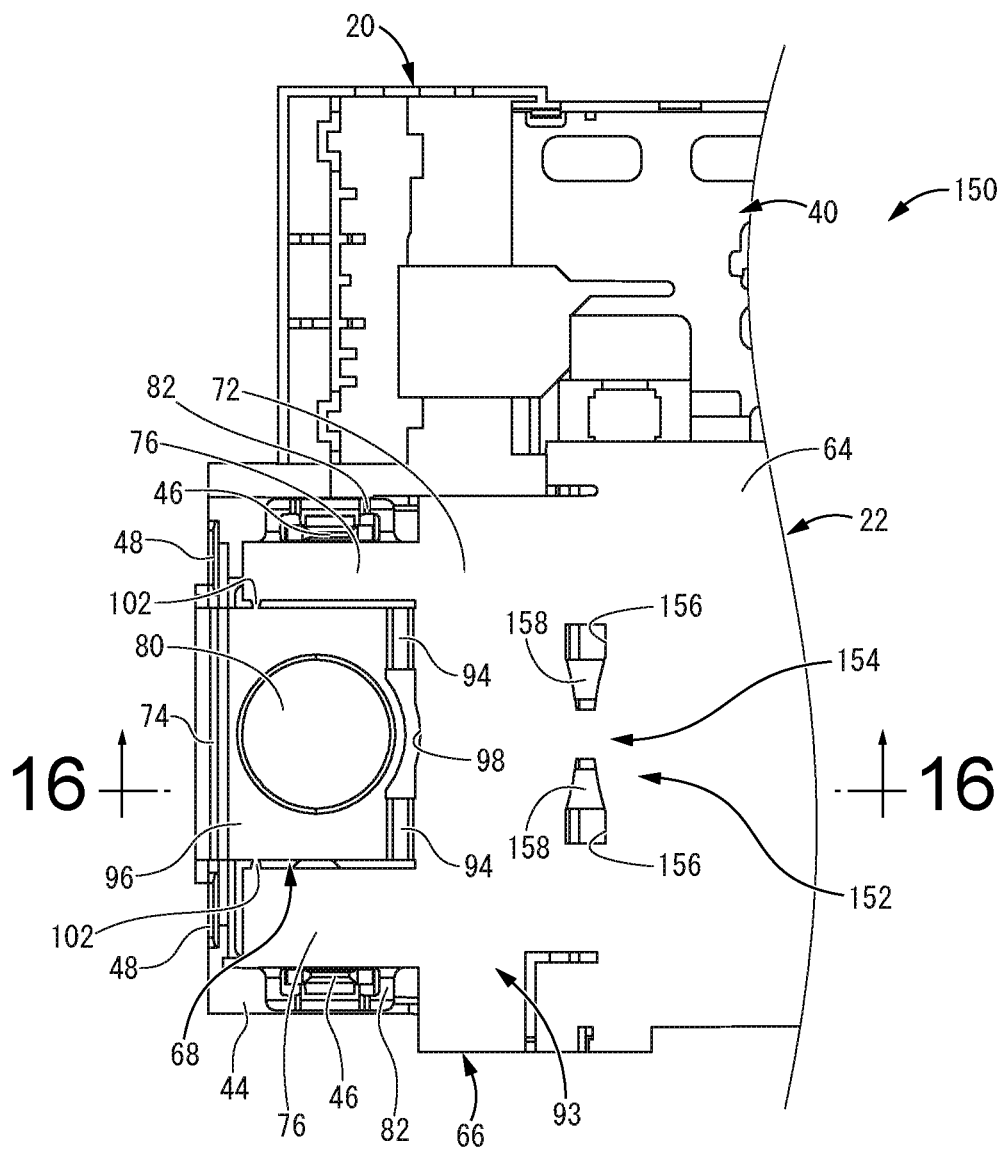
FIG. 15 is a plan view of the battery wiring module shown in FIG. 14.

By rotating the large lid portion 134 having such a shape around the first hinge portion 132 toward the first open end 71b, as shown in FIG. 13, when the large lid portion 134 is located at the first open end 71b, the engaging projection portion 136 is brought into pressure contact and engaged with the corner portion of the linking portion 26 of the terminating bus bar 18a. Accordingly, the large lid portion 134 is configured to be held at the first open end 71b. Therefore, in Embodiment 3, the engage target portion 138 is constituted by the corner portion of the linking portion 26 of the terminating bus bar 18a.

In the battery wiring module 130 of Embodiment 3 constructed in the above manner as well, the large lid portion 134 is held by the retainer (the engaging projection portion 136 and the engage target portion 138) at the first open end 71b. Therefore, the same effect as those of Embodiments 1 and 2 can be exhibited. In particular, in Embodiment 3, a retaining force for retaining the large lid portion 134 at the first open end 71b can be obtained by the physical engaging force between the engaging projection portion 136 and the engage target portion 138. Thus, the large lid portion 134 can be stably held at the first open end 71b.

Embodiment 4

Hereinafter, a battery wiring module 150 according to Embodiment 4 of the present disclosure will be described with reference to FIGS. 14 to 17. In Embodiment 4, a first hinge portion 152 of the battery wiring module 150 includes the thin-walled portions 86, 86 on the opposite side portions in the left-right direction of the cover portion 22 and a butterfly hinge portion 154 provided at the central portion in the left-right direction thereof. The butterfly hinge portion 154 has a structure of a so-called butterfly hinge, and the butterfly hinge portion 154 of Embodiment 4 will be briefly described below.

In Embodiment 4, a pair of through holes 156, 156 are provided in the central portion in the left-right direction between the fixing portion 64 and the large lid portion 66 in the front-rear direction. The through holes 156, 156 are remote from each other in the left-right direction and penetrate the cover portion 22 in the plate thickness direction (the vertical direction). Each through hole 156 has a portion having an approximately trapezoidal shape in plan view shown in FIG. 15. The front-rear dimensions (the left-right dimensions in FIG. 15) of the portions of the two through holes 156, 156 that are close to each other are shortened, while the front-rear dimensions of the portions of the two through holes 156, 156 that are remote from each other are lengthened. Besides, the thin-walled portions 86, 86 linking the fixing portion 64 and the large lid portion 66 are provided on the outer sides in the left-right direction of the two through holes 156, 156.

In each of these through holes 156, a thin-plate portion 158 linking the large lid portion 66 at the front and the fixing portion 64 at the rear is provided. With this configuration, the front-rear dimensions of the portions of the two thin-plate portions 158, 158 that are close to each other are shortened, while the front-rear dimensions of the portions of the two thin-plate portions 158, 158 that are remote from each other are lengthened. The two thin-plate portions 158, 158 are both elastically deformable in the thickness direction due to the rotational displacement of the large lid portion 66, and form a so-called butterfly hinge. The portion between the two through holes 156, 156 in the left-right direction is as thin as the thin-plate portion 158, and the portion between the two through holes 156, 156 in the left-right direction is also elastically deformable.

Figure 16:
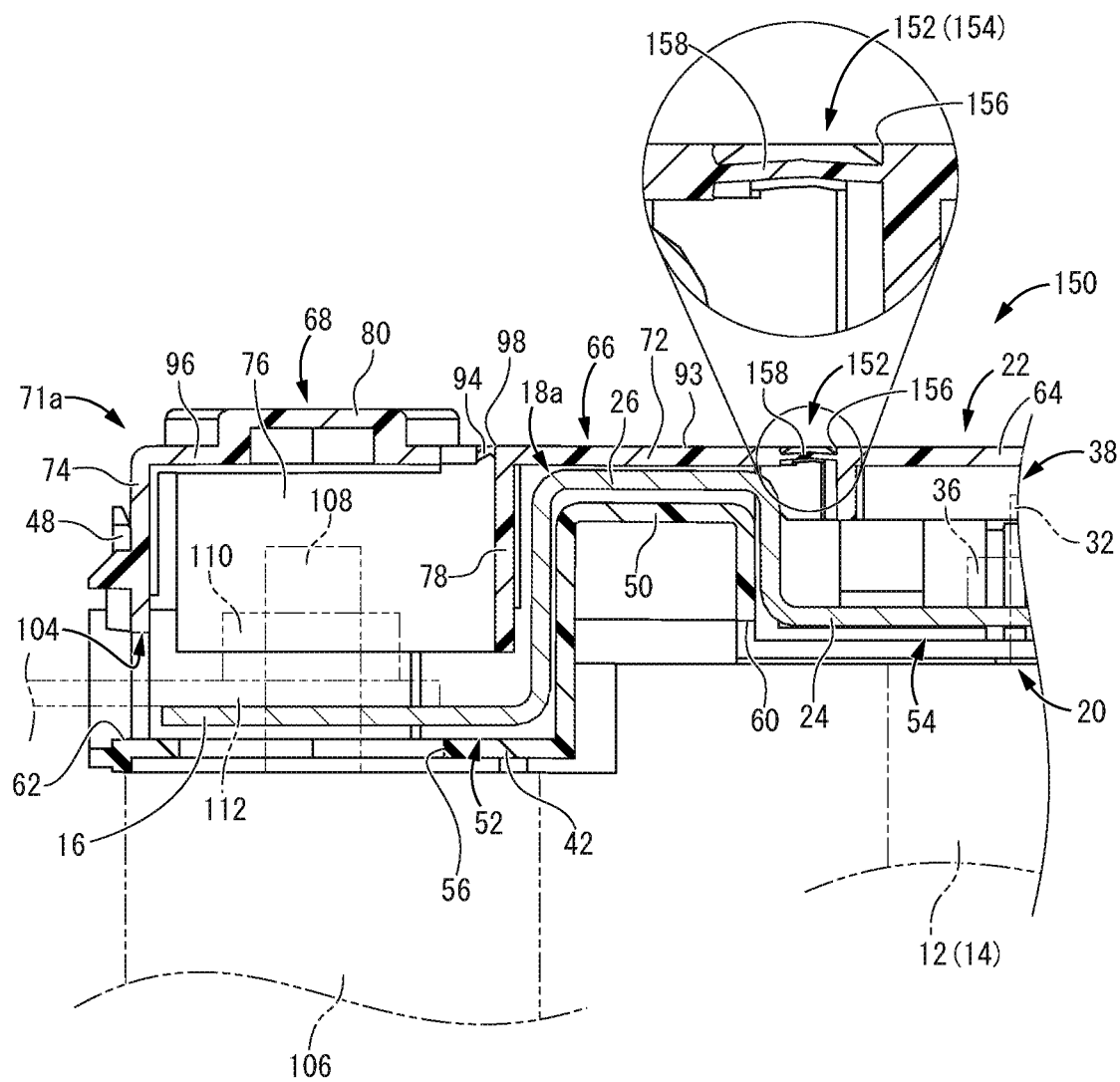
FIG. 16 is a cross sectional view taken along line 16-16 of FIG. 15.
Figure 17:
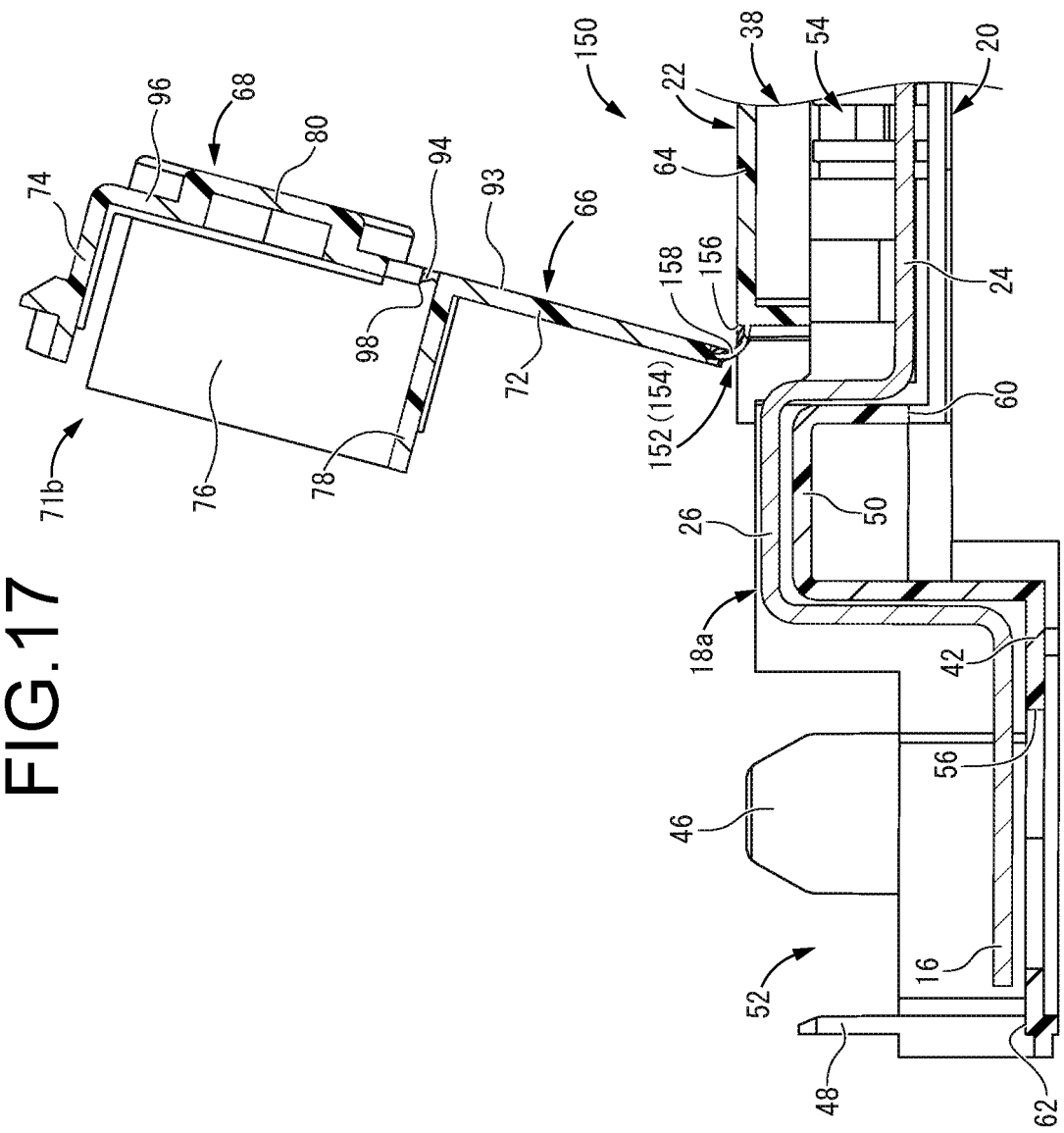
FIG. 17 is a vertical cross-sectional view showing the battery wiring module shown in FIG. 16 in a state where the large lid portion is held at the first open end.

That is, as shown in FIG. 16, in a state where the large lid portion 66 is located at the first closed end 71a, each thin-plate portion 158 is curved so as to be convex outward in the height direction (the vertical direction). By rotating such a large lid portion 66 around the first hinge portion 152 to the first open end, as shown in FIG. 17, each thin-plate portion 158 is elastically deformed so that the direction of curve is the reverse direction, namely, is configured to be curved so as to be convex inward. In such a butterfly hinge, the elastically deformable portions have different lengths on the inside and the outside, and the butterfly hinge takes different stable positions by its direction of curve being reversed. Therefore, the large lid portion 66 is configured to be held at the first open end 71b by each thin-plate portion 158 being elastically deformed such that its direction of curve is reversed. Therefore, in Embodiment 4, the retainer that retains the large lid portion 66 at the first open end 71b includes the two thin-plate portions 158, 158 constituting the butterfly hinge portion 154. Note that the two through holes 156, 156 are not essential, and for example, the two thin-walled portions 86, 86 may extend from the outer sides in the left-right direction of the two thin-plate portions 158, 158.

The battery wiring module 150 of Embodiment 4 having the above-mentioned structure can also exhibit the same effects as those of Embodiments 1 to 3. In Embodiment 4, a butterfly hinge is adopted for the first hinge portion 152, and the large lid portion 66 can be held in a stable position of either the first open end 71b or the first closed end 71a due to rotation of the large lid portion 66.

Variation

Although Embodiments 1 to 4 have been described in detail as specific examples of the present disclosure, the present disclosure is not limited by these specific descriptions. Modifications, improvements, etc. to the extent that the object of the present disclosure can be achieved are included in the present disclosure. For example, the following Variations of the embodiment are also included in the technical scope of the present disclosure.

(1) In the preceding embodiments, the retainer is constituted by the urging arms 84, 124, the engaging projection portion 136 and the engage target portion 138, and the thin-plate portion 158 constituting the butterfly hinge. That is, in the preceding embodiments, the retainer is constituted by a part of the battery wiring modules 10, 120, 130, 150, more specifically, a part of the cover portion 22. However, for example, the retainer that retains the large lid portion at the first open end may be provided to the case constituting the battery wiring module, or may be constituted by a member different from the case and the bus bar. That is, the hinge structure of the first hinge portion is not limited to the three-point hinge and the butterfly hinge exemplified in the preceding embodiments, and any conventionally known hinge structure can be adopted.

(2) In Embodiment 3, the engage target portion that engages with the engaging projection portion of the large lid portion is not limited to the corner portion of the linking portion of the terminating bus bar 18a, and may be another portion of the terminating bus bar 18a, or may be the case.

(3) The specific shape of the case, the cover portion, and the bus bar is not limited, and may be appropriately designed or changed depending on the arrangement mode of the plurality of cells (the cell group) and the like.

(4) As described above, the present disclosure discloses the specific structure of the part A in FIG. 1 (the connection portion between the terminal portion of the cell group 14 and the battery wiring module 10). For example, in FIG. 1, the specific structures of the intermediate portion in the front-rear direction of the battery wiring module 10 extending in the front-rear direction and the end portion on the side opposite to the part A (the rear end portion) are not limited. For example, in the battery wiring module 10, the end portion on the side opposite to the part A (the rear end portion) may have or need not have the structure according to the present disclosure.

(5) In the preceding embodiments, the battery wiring modules 10, 120, 130, 150 are fixed to the fixing member 106 by the nut 110 being fastened to the fixing bolt 108 projecting upward from the fixing member 106 such as a cabinet. However, the battery wiring module may be fixed to the fixing member by a fixing bolt being inserted from above into the fixing member having a nut inside to be fastened.

What is claimed is:

1. A battery wiring module configured to be mounted on a cell group in which a plurality of cells are arranged side by side, the battery wiring module comprising:
    a plurality of bus bars configured to be electrically connected to the cell group, the bus bars including a terminating bus bar having an external connection portion;
    a case of insulation accommodating the plurality of bus bars;
    a cover portion mounted on the case to cover the plurality of bus bars, the cover portion comprising:
        a fixing portion fixedly mounted on the case,
        a large lid portion attached to the fixing portion via a first hinge portion to cover the external connection portion and a peripheral region of the external connection portion of the terminating bus bar, the large lid portion being rotatable around the first hinge portion from a first closed end covering the external connection portion and the peripheral region of the external connection portion, to a first open end exposing the external connection portion and the peripheral region of the external connection portion, and
        a small lid portion constituted by a part of the large lid portion and attached to the large lid portion via a second hinge portion to cover the external connection portion, the small lid portion being rotatable around the second hinge portion from a second closed end covering the external connection portion, to a second open end exposing the external connection portion; and
    a retainer configured to retain the large lid portion at the first open end, wherein
    the small lid portion is rotatable to the second open end with the large lid portion retained at the first closed end.

2. The battery wiring module according to claim 1, wherein
    the retainer includes an urging arm whose opposite end portions are linked to the fixing portion and the large lid portion, the urging arm being configured to exert an urging force between the fixing portion and the large lid portion,
    the urging arm is elastically deformable due to rotational displacement of the large lid portion with respect to the fixing portion, and the urging arm undergoes tensile deformation until passing an intermediate position between the first closed end and the first open end, and
    after passing the intermediate position, the urging arm elastically recovers such that the urging arm exerts the urging force urging the large lid portion toward the fixing portion to retain the large lid portion at the first open end.

3. The battery wiring module according to claim 2, wherein the urging arm has an L-letter shape in which a side linked to the fixing portion and a side linked to the large lid portion are orthogonal to each other.

4. The battery wiring module according to claim 2, wherein a linking portion of the urging arm to the large lid portion is located inside in a height direction with respect to an outer surface of the large lid portion, and the urging arm has a curved shape that is convex outward in the height direction.

5. The battery wiring module according to claim 1, wherein
    the retainer includes a plate portion whose opposite end portions are linked to the fixing portion and the large lid portion, the plate portion constituting a butterfly hinge that is elastically deformable due to rotational displacement of the large lid portion with respect to the fixing portion,
    in a state where the large lid portion is located at the first closed end, the plate portion is curved to be convex outward in a height direction, and
    the large lid portion is configured to be held at the first open end by the plate portion being elastically deformed such that a direction of curve of the plate portion is reversed.

6. The battery wiring module according to claim 1, wherein
    the retainer includes an engaging projection portion located on a side of the first hinge portion while projecting from the large lid portion, and an engage target portion provided on a side of the case, and
    when the large lid portion is located at the first open end, the engaging projection portion is brought into pressure contact and engaged with the engage target portion such that the large lid portion is held at the first open end.

7. The battery wiring module according to claim 1, wherein
    the external connection portion is configured to be connected to a conductor, and
    in a state where the small lid portion is located at the second closed end, a gap is formed between the small lid portion and the case, and the small lid portion is held at the second closed end with the conductor extending from the gap to an outside.

8. The battery wiring module according to claim 1, wherein the small lid portion is permitted to be displaced toward a side of the second open end by elastic deformation of the second hinge portion, while the small lid portion is configured to be held on a side of the second closed end by an elastic recovery force of the second hinge portion.

9. A battery wiring module configured to be mounted on a cell group in which a plurality of cells are arranged side by side, the battery wiring module comprising:
    a plurality of bus bars configured to be electrically connected to the cell group, the bus bars including a terminating bus bar having an external connection portion;
    a case of insulation accommodating the plurality of bus bars;
    a cover portion mounted on the case to cover the plurality of bus bars, the cover portion comprising:
        a fixing portion fixedly mounted on the case,
        a large lid portion attached to the fixing portion via a first hinge portion to cover the external connection portion and a peripheral region of the external connection portion of the terminating bus bar, the large lid portion being rotatable around the first hinge portion from a first closed end covering the external connection portion and the peripheral region of the external connection portion, to a first open end exposing the external connection portion and the peripheral region of the external connection portion, and
        a small lid portion constituted by a part of the large lid portion and attached to the large lid portion via a second hinge portion to cover the external connection portion, the small lid portion being rotatable around the second hinge portion from a second closed end covering the external connection portion, to a second open end exposing the external connection portion; and
a retainer configured to retain the large lid portion at the first open end, wherein
an endmost portion of the small lid portion extending toward a front side of the battery wiring module is rotationally displaceable independently from an endmost portion of the large lid portion extending toward the front side of the battery wiring module.

* * * * *